United States Patent
Ohkubo

(10) Patent No.: US 8,457,923 B2
(45) Date of Patent: Jun. 4, 2013

(54) VELOCITY CALCULATING APPARATUS, VELOCITY CALCULATING METHOD, NAVIGATION APPARATUS, AND MOBILE PHONE WITH NAVIGATION FUNCTION

(75) Inventor: Masashi Ohkubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/899,793

(22) Filed: Oct. 7, 2010

(65) Prior Publication Data

US 2011/0136512 A1    Jun. 9, 2011

(30) Foreign Application Priority Data

Dec. 3, 2009    (JP) ................................. 2009-275758

(51) Int. Cl.
| | |
|---|---|
| G01C 21/00 | (2006.01) |
| G01C 21/10 | (2006.01) |
| G06F 19/00 | (2006.01) |
| G06F 17/40 | (2006.01) |

(52) U.S. Cl.
USPC ... 702/150; 73/488; 340/995.25; 340/995.28; 701/400; 708/200

(58) Field of Classification Search
USPC ............ 73/1.01, 1.37, 1.38, 1.75, 1.76, 1.77, 73/1.78, 1.79, 1.81, 178 R, 488, 503, 510, 73/511, 514.01, 514.02; 324/160, 162; 340/944, 340/988, 995.1, 995.14, 995.15, 995.17, 340/995.25, 995.28; 701/400, 408, 409, 410, 701/411, 412, 431, 433, 434, 445, 467, 468, 701/469, 472, 500, 501, 527; 702/1, 85, 94, 702/95, 96, 97, 104, 127, 141, 142, 145, 702/149, 150, 151, 152, 153, 154, 187, 189; 708/100, 105, 200
See application file for complete search history.

(56) References Cited

U.S. PATENT DOCUMENTS

| | | | | |
|---|---|---|---|---|
| 3,430,234 | A | * | 2/1969 | Wright ............................ 342/46 |
| 5,935,191 | A | * | 8/1999 | Sakanashi et al. ............ 701/500 |

(Continued)

FOREIGN PATENT DOCUMENTS

| | | |
|---|---|---|
| DE | 197 28 109 A1 | 2/1999 |
| DE | 103 54 944 A1 | 6/2005 |

(Continued)

OTHER PUBLICATIONS

U.S. Appl. No. 12/818,556, filed Jun. 18, 2010, Ohkubo.

(Continued)

*Primary Examiner* — Edward Cosimano
(74) *Attorney, Agent, or Firm* — Oblon, Spivak, McClelland, Maier & Neustadt, L.L.P.

(57) ABSTRACT

Provided is a velocity calculating apparatus including: a horizontal-angular-velocity-detecting portion disposed to a main-body portion attached to a movable object moving along a movement plane to detect a horizontal-axis angular velocity around a horizontal axis perpendicular to a moving direction generated according to an inclination angle of the movement plane; a vertical-acceleration-detecting portion disposed to the main-body portion to detect a vertical acceleration generated according to a shape of the movement plane; a time-difference-calculating portion configured to calculate a time difference between characteristic components occurring in the horizontal-axis angular velocity and the vertical acceleration due to a position of the movement plane; and a velocity-calculating portion configured to calculate a time-differential velocity based on a ratio between an installation distance from a position to which the horizontal angular velocity is exerted in the overall movable object to an installation position of the main body portion and the time difference.

18 Claims, 23 Drawing Sheets

U.S. PATENT DOCUMENTS

| | | | |
|---|---|---|---|
| 7,392,155 B2 * | 6/2008 | Fujii et al. | 702/158 |
| 8,195,392 B2 * | 6/2012 | Watanabe et al. | 701/472 |
| 2006/0139619 A1 * | 6/2006 | Fujii et al. | 356/4.03 |
| 2008/0071476 A1 | 3/2008 | Hoshizaki | |
| 2010/0030471 A1 * | 2/2010 | Watanabe et al. | 701/217 |
| 2010/0057360 A1 * | 3/2010 | Ohkubo | 701/220 |
| 2011/0054781 A1 * | 3/2011 | Ohkubo | 701/207 |
| 2011/0066376 A1 * | 3/2011 | Takaoka | 701/220 |
| 2011/0066377 A1 * | 3/2011 | Takaoka | 701/220 |

FOREIGN PATENT DOCUMENTS

| | | |
|---|---|---|
| EP | 1 903 306 A2 | 3/2008 |
| JP | 2008-76389 | 4/2008 |

OTHER PUBLICATIONS

Search Report issued Jan. 28, 2011 in Europe Application No. 10187915.3.

* cited by examiner

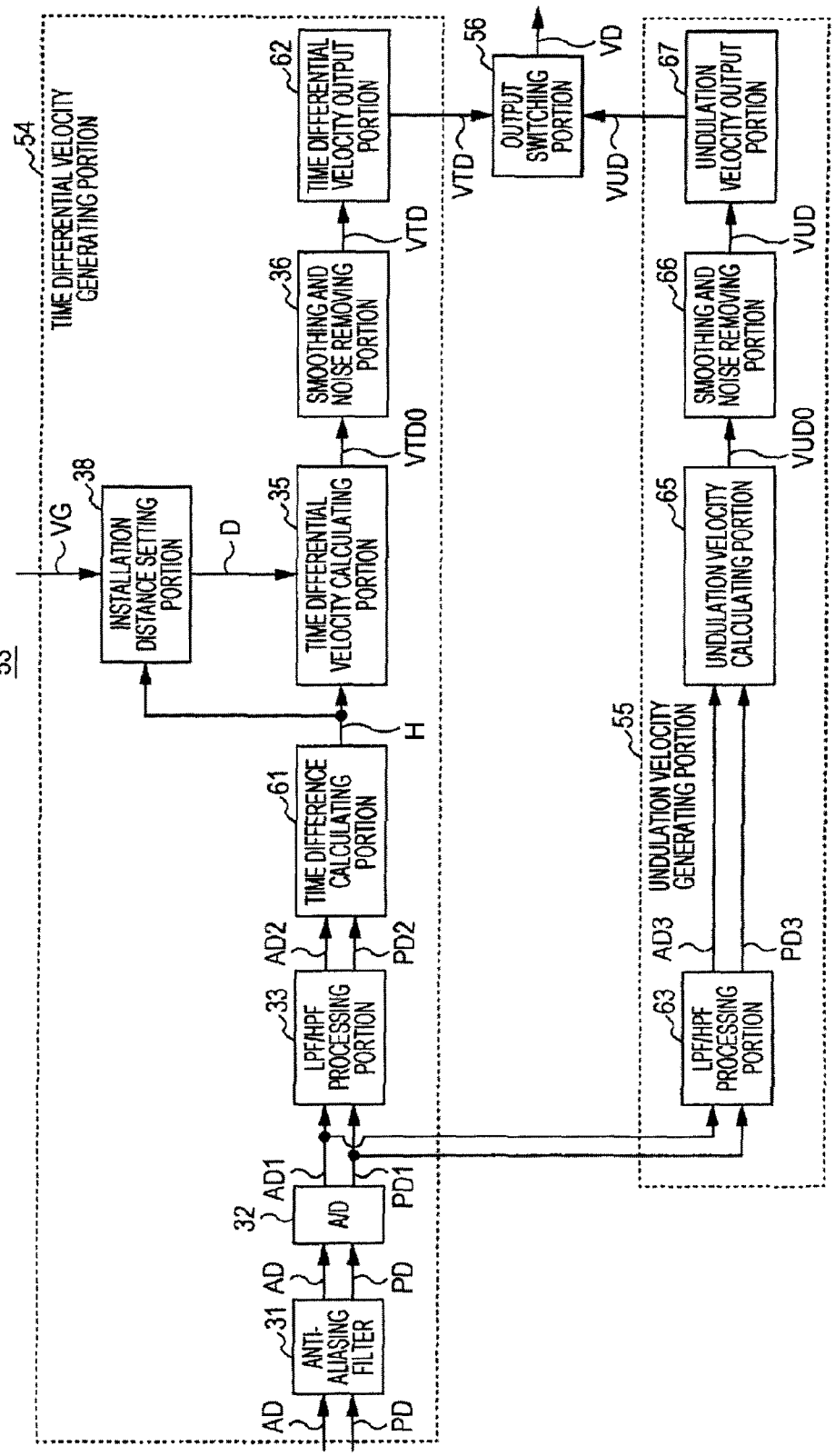

FIG. 24A

| STEP NUMBER | TIME DIFFERENCE ΔT [s] | D/ΔT | TIME DIFFERENTIAL VELOCITY VT | |
|---|---|---|---|---|
| | | | [m/s] | [km/h] |
| 1 | 0.02 | 1/0.02 | 50 | 180 |
| 2 | 0.04 | 1/0.04 | 25 | 90 |
| 3 | 0.06 | 1/0.06 | 16.7 | 60 |
| 4 | 0.08 | 1/0.08 | 12.5 | 45 |
| 5 | 0.10 | 1/0.1 | 10 | 36 |
| 6 | 0.12 | 1/0.12 | 8.33 | 30 |
| 7 | 0.14 | 1/0.14 | 7.14 | 25.7 |
| 8 | 0.16 | 1/0.16 | 6.25 | 22.5 |
| 9 | 0.18 | 1/0.18 | 5.56 | 20 |
| 10 | 0.20 | 1/0.2 | 5 | 18 |

FIG. 24B

| STEP NUMBER | TIME DIFFERENCE ΔT [s] | D/ΔT | TIME DIFFERENTIAL VELOCITY VT | |
|---|---|---|---|---|
| | | | [m/s] | [km/h] |
| 1 | 0.02 | 0.5/0.02 | 25 | 90 |
| 2 | 0.04 | 0.5/0.04 | 12.5 | 45 |
| 3 | 0.06 | 0.5/0.06 | 8.33 | 30 |
| 4 | 0.08 | 0.5/0.08 | 6.25 | 22.5 |
| 5 | 0.10 | 0.5/0.1 | 5 | 18 |
| 6 | 0.12 | 0.5/0.12 | 4.167 | 15 |
| 7 | 0.14 | 0.5/0.14 | 3.57 | 12.85 |
| 8 | 0.16 | 0.5/0.16 | 3.125 | 11.25 |
| 9 | 0.18 | 0.5/0.18 | 2.78 | 10 |
| 10 | 0.20 | 0.5/0.2 | 2.5 | 9 |

VELOCITY CALCULATING APPARATUS, VELOCITY CALCULATING METHOD, NAVIGATION APPARATUS, AND MOBILE PHONE WITH NAVIGATION FUNCTION

BACKGROUND OF THE INVENTION

1. Field of the Present Invention

The invention relates to a velocity calculating apparatus, a velocity calculating method, a navigation apparatus, and a mobile phone with a navigation function, and more particularly, to a portable type navigation apparatus.

2. Description of the Related Art

In the related art, a navigation apparatus is configured to receive positioning signals (hereinafter, referred to as GPS signals) from a plurality of GPS (global positioning system) satellites and to calculate a current position of a movable object (for example, a vehicle, or the like) based on the GPS signals.

However, in such a navigation apparatus, in the case where a vehicle in which the navigation apparatus is installed enters into, for example, a tunnel, an underground parking lot, or the like, the GPS signals may not be received from the GPS satellites, so that the current position of the vehicle may not be calculated based on the GPS signals.

Therefore, among the navigation apparatuses, there is a navigation apparatus which calculates the current position even in the case where the GPS signals may not be received. In the navigation apparatus, at the time of cornering, a velocity in a moving direction is calculated based on an acceleration in the horizontal direction perpendicular to the moving direction of the vehicle and an angular velocity around the vertical axis perpendicular to the moving direction, and the current position is calculated based on the velocity in the moving direction (for example, refer to Japanese Unexamined Patent Application Publication No. 2008-76389).

SUMMARY OF THE INVENTION

However, in the navigation apparatus having such a configuration, since the accuracy of the velocity in the moving direction calculated based on the acceleration in the horizontal direction and the angular velocity around the vertical axis is not necessarily high, the current position calculated based on the velocity also includes some degrees of error.

As a result, the navigation apparatus has a problem in that the accuracy of the position in the map display or path guidance is lowered, so that the navigation apparatus may not recommend an appropriate map or path.

It is desirable to provide a velocity calculating apparatus and a velocity calculating method capable of calculating a velocity of a vehicle with high accuracy and a navigation apparatus and a mobile phone with a navigation function capable of calculating a position of a vehicle with high accuracy.

According to an embodiment of the invention, there are provided a velocity calculating apparatus and a velocity calculating method, wherein a horizontal angular velocity detecting portion disposed to a main body portion attached to a movable object moving along a movement plane is allowed to detect a horizontal axis angular velocity which is an angular velocity around a horizontal axis perpendicular to a moving direction of the movable object generated according to an inclination angle of the movement plane; a vertical acceleration detecting portion disposed to the main body portion is allowed to detect a vertical acceleration which is an acceleration in the vertical direction generated according to a shape of the movement plane; a predetermined time difference calculating portion is allowed to calculate a time difference between a characteristic component occurring in the horizontal axis angular velocity and a characteristic component occurring in the vertical acceleration due to a predetermined position of the movement plane; and a predetermined velocity calculating portion is allowed to calculate a time differential velocity representing a velocity in the moving direction of the movable object based on a ratio between an installation distance from a position to which the horizontal angular velocity is estimated to be exerted in the overall movable object to an installation position of the main body portion and the time difference.

In the movable object, the vertical acceleration occurs at every position in the movable object according to the shape of the movement plane, and the horizontal angular velocity is changed in the overall movable object, so that the horizontal angular velocity is estimated to be exerted to a predetermined position. For this reason, in the invention, it is possible to calculate the velocity of the movable object with good accuracy based on the ratio between the distance from the position to which the horizontal angular velocity is estimated to be exerted to the installation position and the time difference between the vertical acceleration and the horizontal angular velocity.

In addition, according to another embodiment of the invention, there is provided a navigation apparatus including: a horizontal angular velocity detecting portion disposed to a main body portion attached to a movable object moving along a movement plane and configured to detect a horizontal axis angular velocity which is an angular velocity around a horizontal axis perpendicular to a moving direction of the movable object generated according to an inclination angle of the movement plane; a vertical acceleration detecting portion disposed to the main body portion and configured to detect a vertical acceleration which is an acceleration in the vertical direction generated according to a shape of the movement plane; a time difference calculating portion configured to calculate a time difference between a characteristic component occurring in the horizontal axis angular velocity and a characteristic component occurring in the vertical acceleration due to a predetermined position of the movement plane; a velocity calculating portion configured to calculate a time differential velocity representing a velocity in the moving direction of the movable object based on a ratio between an installation distance from a position to which the horizontal angular velocity is estimated to be exerted in the overall movable object to an installation position of the main body portion and the time difference; a vertical direction angular velocity detecting portion configured to calculate an angular velocity around a vertical axis perpendicular to the moving direction of the movable object; an angle calculating portion configured to calculate a circulating angle of the movable object based on the angular velocity around the vertical axis; and a position calculating portion configured to calculate a position of the movable object based on the velocity in the moving direction calculated by the velocity calculating portion and the angle calculated by the angle calculating portion.

In the movable object, the vertical acceleration occurs at every position in the movable object according to the shape of the movement plane, and the horizontal angular velocity is changed in the overall movable object, so that the horizontal angular velocity is estimated to be exerted to a predetermined position. For this reason, in the invention, it is possible to calculate the velocity of the movable object with good accuracy based on the ratio between the distance from the position to which the horizontal angular velocity is estimated to be exerted to the installation position and the time difference between the vertical acceleration and the horizontal angular velocity, and it is possible to calculate the position of the movable object with good accuracy based on the velocity of the movable object and the calculated angle.

In addition, according to still another embodiment of the invention, there is provided a mobile phone with a navigation function, including: a horizontal angular velocity detecting portion disposed to a main body portion attached to a movable object moving along a movement plane and configured to detect a horizontal axis angular velocity which is an angular velocity around a horizontal axis perpendicular to a moving direction of the movable object generated according to an inclination angle of the movement plane; a vertical acceleration detecting portion disposed to the main body portion and configured to detect a vertical acceleration which is an acceleration in the vertical direction generated according to a shape of the movement plane; a time difference calculating portion configured to calculate a time difference between a characteristic component occurring in the horizontal axis angular velocity and a characteristic component occurring in the vertical acceleration due to a predetermined position of the movement plane; a velocity calculating portion configured to calculate a time differential velocity representing a velocity in the moving direction of the movable object based on a ratio between an installation distance from a position to which the horizontal angular velocity is estimated to be exerted in the overall movable object to an installation position of the main body portion and the time difference; a vertical direction angular velocity detecting portion configured to calculate an angular velocity around a vertical axis perpendicular to the moving direction of the movable object; an angle calculating portion configured to calculate a circulating angle of the movable object based on the angular velocity around the vertical axis; a position calculating portion configured to calculate a position of the movable object based on the velocity in the moving direction calculated by the velocity calculating portion and the angle calculated by the angle calculating portion; and a mobile phone portion configured to perform a call process through radio communication with a predetermined base station.

In the movable object, the vertical acceleration occurs at every position in the movable object according to the shape of the movement plane, and the horizontal angular velocity is changed in the overall movable object, so that the horizontal angular velocity is estimated to be exerted to a predetermined position. For this reason, in the invention, it is possible to calculate the velocity of the movable object with good accuracy based on the ratio between the distance from the position to which the horizontal angular velocity is estimated to be exerted to the installation position and the time difference between the vertical acceleration and the horizontal angular velocity, and it is possible to calculate the position of the movable object with good accuracy based on the velocity of the movable object and the calculated angle.

According to the invention, it is possible to calculate a velocity of a movable object with good accuracy based on a ratio between a distance from a position to which a horizontal angular velocity is estimated to be exerted to an installation position and a time difference between a vertical acceleration and the horizontal angular velocity. Therefore, according to the invention, it is possible to implement a velocity calculating apparatus and a velocity calculating method capable of calculating the velocity of the movable object with high accuracy.

In addition, according to the invention, it is possible to calculate a velocity of a movable object with good accuracy based on a ratio between a distance from a position to which a horizontal angular velocity is estimated to be exerted to an installation position and a time difference between a vertical acceleration and the horizontal angular velocity, and it is possible to calculate a position of the movable object with good accuracy based on the velocity of the movable object and a calculated angle. Therefore, according to the invention, it is possible to implement a navigation apparatus and a mobile phone with a navigation function capable of calculating the position of the movable object with high accuracy.

BRIEF DESCRIPTION OF THE DRAWINGS

FIG. 22 is a schematic diagram illustrating a configuration of an autoregulation velocity calculating portion according to the second embodiment.

FIGS. 24A and 24B are schematic diagrams illustrating a relationship between a discrete time difference and a time differential velocity.

DESCRIPTION OF THE PREFERRED EMBODIMENTS

Figure 1:
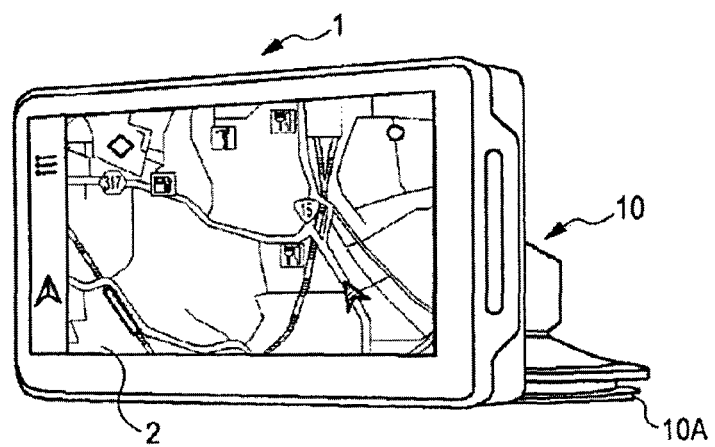
FIG. 1 is a schematic diagram illustrating the entire configuration of a PND.

Hereinafter, embodiments for implementing the invention (hereinafter, referred to as embodiments) will be described with reference to the drawings. The description will be made in the following order.
1. First Embodiment (Example of Navigation Apparatus Using Time Differential Velocity)
2. Second Embodiment (Example of Navigation Apparatus Using Time Differential Velocity and Undulation Velocity by Switching)
3. Third Embodiment (Mobile Phone)
4. Other Embodiments
1. First Embodiment
1-1. Configuration of PND In the invention, as a navigation apparatus, a portable navigation apparatus (hereinafter, referred to as a PND (Personal Navigation Device) 1) illustrated in FIG. 1 is used.

The PND 1 is provided with a display portion 2 on the front surface thereof. Map images or the like according to map data stored in a built-in non-volatile memory or the like (described later) are displayed on the display portion 2, so that the contents may be recommended to a user.

In addition, if the PND 1 is mounted on a cradle 10, the PND 1 is mechanically or electrically connected to the cradle 10. The cradle 10 is attached through a sucker 10A on a dashboard or the like of a vehicle 9 illustrated in FIG. 2.

Therefore, the PND 1 is configured to be operated by a power supplied through the cradle 10 from a battery of the vehicle 9. When the PND 1 is detached from the cradle 10, the PND 1 is configured to be operated by a power supplied from a built-in battery in an independent state.

In addition, as the installation positions of the cradle 10 and the PND 1 with respect to the vehicle 9, a relative front-side installation position N1 in a vehicle room of the vehicle 9, a substantially central installation position N2 in the vehicle room, a relative rear-side installation position N3 in the vehicle room, and the like may be used.

Figure 3:
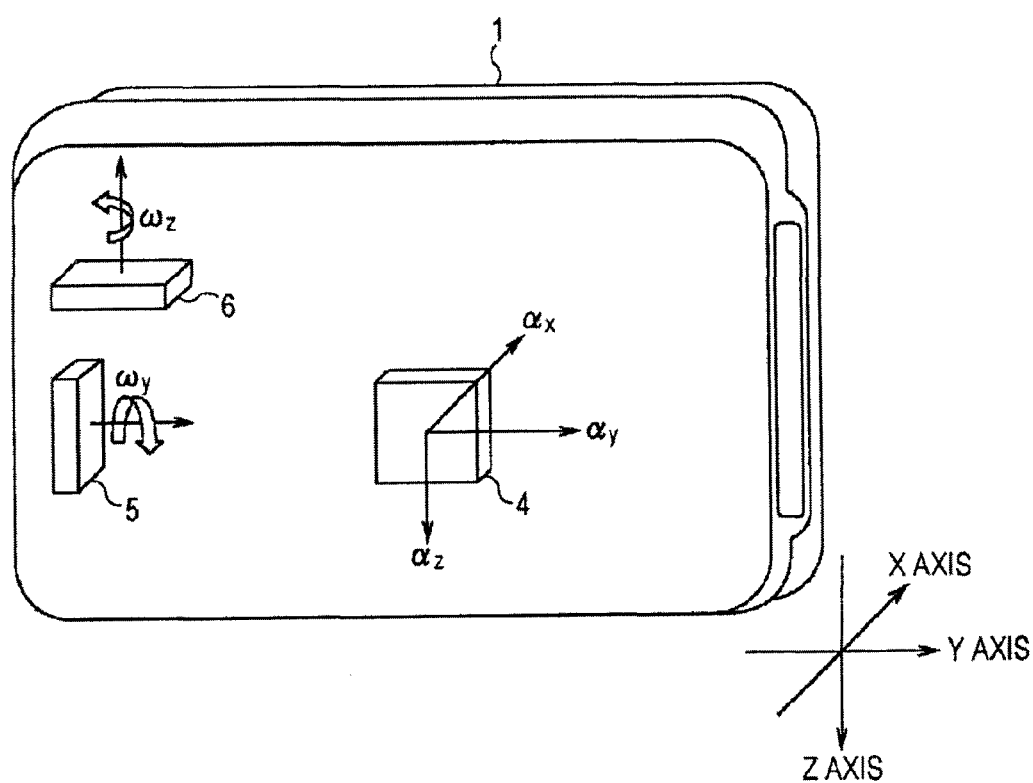
FIG. 3 is a schematic diagram illustrating a sensor configuration and definition of coordinate diameter in a PND.

Herein, the PND 1 is installed so that the display portion 2 is substantially perpendicular to the moving direction of the vehicle 9. In this case, as illustrated in FIG. 3, in the coordinate system of the PND 1, the forward/backward direction (moving direction) of the vehicle 9 is denoted by the X axis; the horizontal direction perpendicular to the X axis is denoted by the Y axis; and the upward/downward direction is denoted by the Z axis.

In the coordinate system, the moving direction of the vehicle 9 is defined as the positive X axis; the rightward direction is defined as the positive Y axis; and the downward direction is defined as the positive Z axis.

In addition, the PND 1 is provided with a three-axis acceleration sensor 4, a Y axis gyro-sensor 5, and a Z axis gyro-sensor 6 in an inner portion thereof.

The three-axis acceleration sensor 4 is configured to detect an acceleration $\alpha_x$ in the X axis, an acceleration $\alpha_y$ in the Y axis, and an acceleration $\alpha_z$ in the Z axis as voltage values in a predetermined sampling period.

In addition, the Y axis gyro-sensor 5 and the Z axis gyro-sensor 6 are configured to detect a pitch rate $\omega_y$ around the Y axis and a yaw rate $\omega_z$ around the Z axis as voltage values in a predetermined sampling period, respectively.
1-2. Basic Principles The PND 1 according to the invention is also configured to perform an autoregulation positioning process of calculating a velocity (hereinafter, referred to as an autoregulation velocity V) of the vehicle 9 moving on a road and then calculating the current position based on the acceleration, the pitch rate, and the like detected by the three-axis acceleration sensor 4, the Y axis gyro-sensor 5, and the like. Herein, the basic principle of calculation of the velocity and the current position is described.

In addition, as the movable object, the vehicle 9 has two wheel axes. Like a general passenger car, the vehicle 9 is assumed to be a four-wheel car having two front wheels rotating about the front wheel axis and two rear wheels rotating about the rear wheel axis.
1-2-1. Basic Principle of Velocity Calculation In general, in most cases, road surface as a movement plane is not entirely flat, but it has some degree of unevenness. When the vehicle 9 drives on the road surface, the vehicle 9 moves along the road surface by allowing wheels to abut on the road surface due to its gravity and allowing the wheels to rotate.

Herein, for example, at the time when the vehicle 9 rides over a step, the acceleration in the vertical direction becomes a large value at the front side of the vehicle and a small value at the rear side of the vehicle. In other words, in the vehicle 9, the acceleration in the vertical direction at each position in the vehicle 9 occurs corresponding to the position.

Therefore, the PND 1 installed in the vehicle 9 may detect the acceleration $\alpha_z$ at the installation position by the three-axis acceleration sensor 4.

Figure 2:
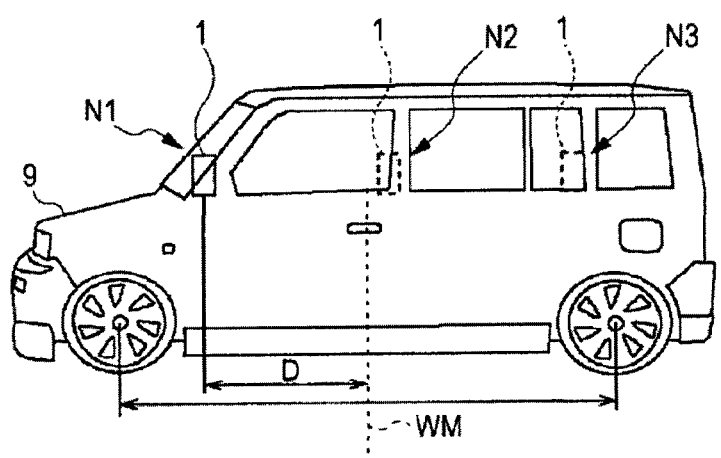
FIG. 2 is a schematic diagram illustrating an installation position of a PND with respect to a vehicle.

On the other hand, in the vehicle 9, in order to move while maintaining the state that the wheels are in contact with the road surface, the slope of the entire body is changed, so that the angular velocity (that is, the pitch rate $\omega_y$) around the Y axis (FIG. 3) occurs. The angular velocity occurs because the front and rear wheels track the shape of the road surface. Therefore, the angular velocity may be estimated to be exerted to the central point WM of the front and rear wheel axes (FIG. 2).

In other words, for example, in the case where the PND 1 is installed at the installation position N1 (FIG. 2) of the front side of the vehicle 9, the acceleration $\alpha_z$ is the detection value at the installation position N1, and the pitch rate $\omega_y$ is the detection value at the central point WM of the wheel axes.

For example, in the case where the vehicle 9 drives forwards on a road surface of which a portion is convex, a characteristic component according to the convex position occurs in the detection value of the acceleration $\alpha_z$ at a predetermined time point $T\alpha$, and after some time difference $\Delta T$ elapses, a characteristic component according to the convex position occurs in the detection value of the pitch rate $\omega_y$ at a predetermined time point $T\omega$.

Figure 4:
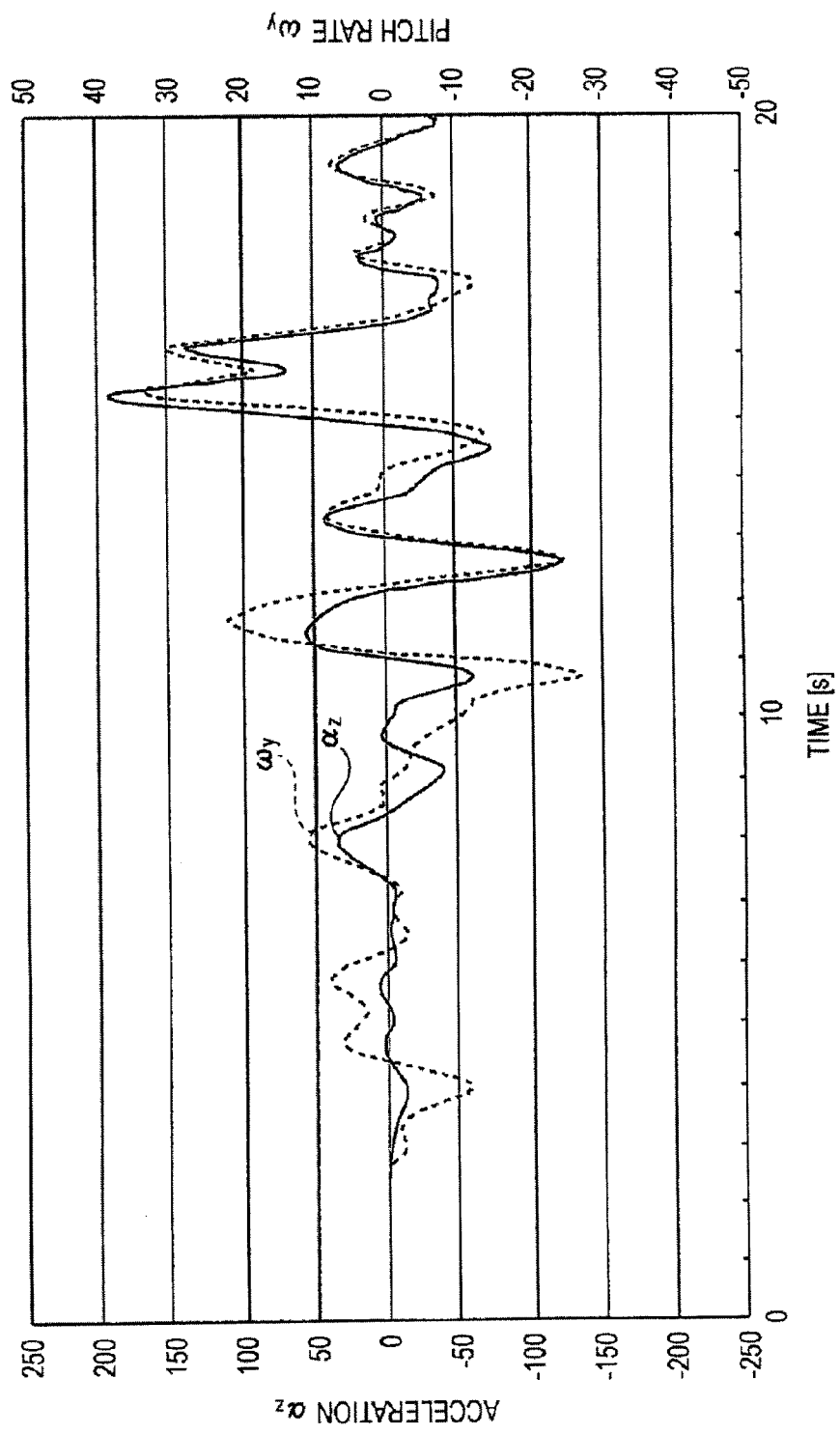
FIG. 4 is a schematic diagram illustrating measurement results of an acceleration and a pitch rate at a front side of a vehicle.
Figure 5:
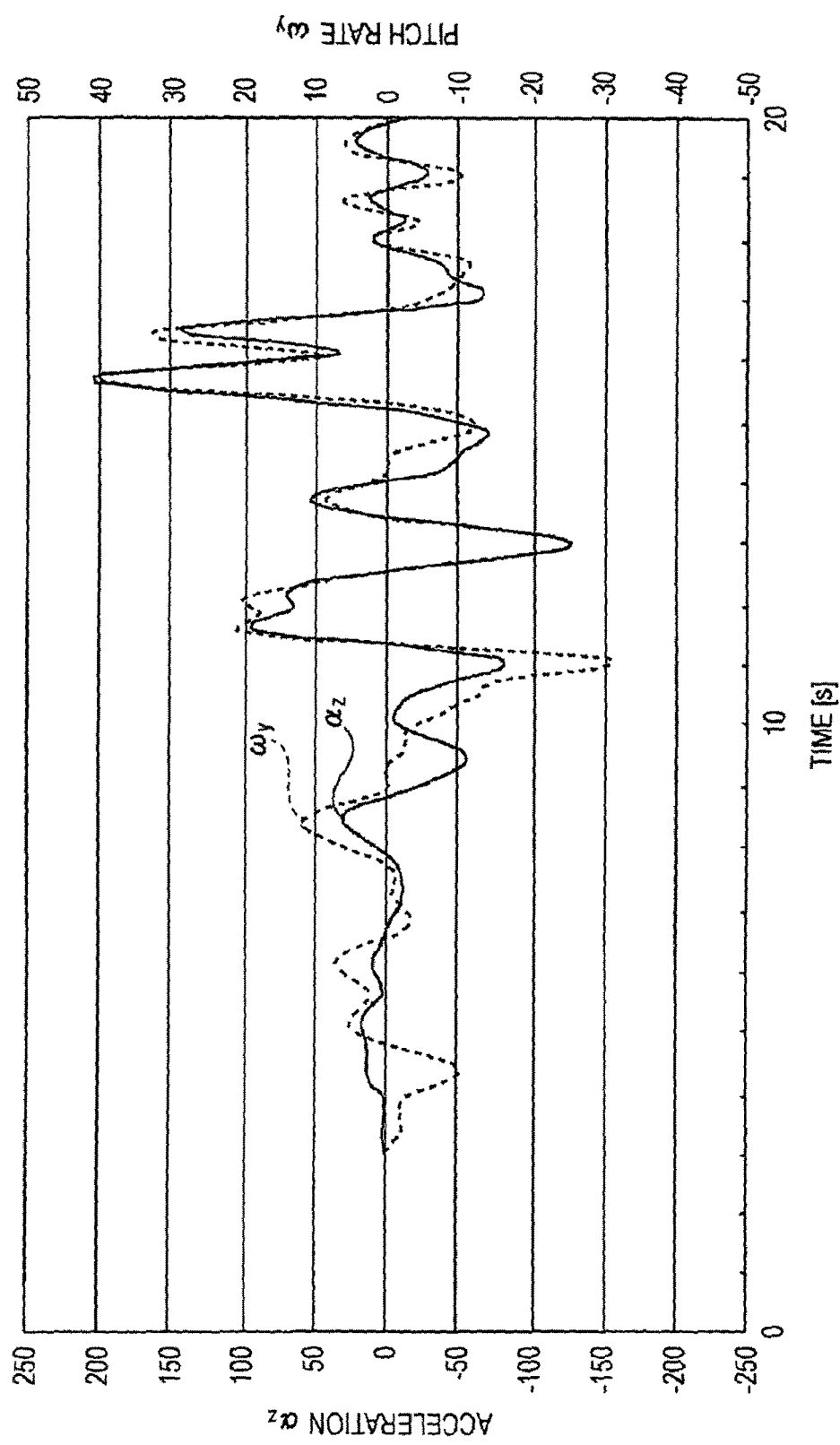
FIG. 5 is a schematic diagram illustrating measurement results of an acceleration and a pitch rate at a center of a vehicle.
Figure 6:
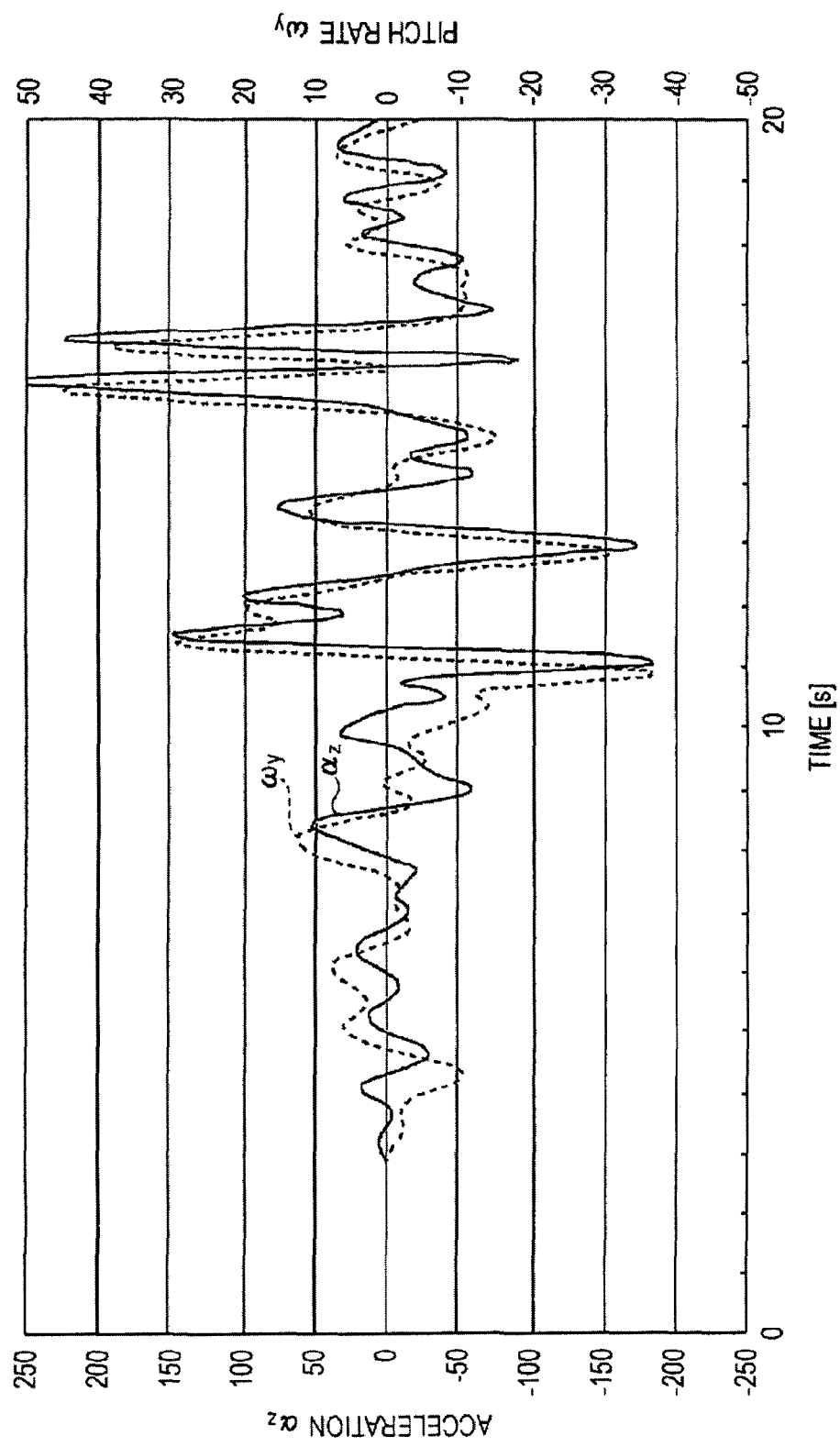
FIG. 6 is a schematic diagram illustrating measurement results of an acceleration and a pitch rate at a rear side of a vehicle.

Herein, the vehicles 9 in which the PNDs 1 are installed at the installation position N1 (front side), N2 (central portion), and N3 (rear side) thereof drive on an actual road, and the measurement results of the accelerations $\alpha_z$ and the pitch rates $\omega_y$ obtained in these cases are illustrated as graphs in FIGS. 4, 5, and 6.

It is understood from FIG. 4 that, in the case where the PND 1 is installed at the installation position N1 which is the front side of the vehicle 9, the acceleration $\alpha_z$ precedes the pitch rate $\omega_y$ by about 0.08 [s].

In addition, it is understood from FIG. 5 that, in the case where the PND 1 is installed at the installation position N2 which is the substantially center portion of the vehicle 9, the acceleration $\alpha_z$ and the pitch rate $\omega_y$ are substantially simultaneously changed.

In addition, it is understood from FIG. 6 that, in the case where the PND 1 is installed at the installation position N3 which is the rear side of the vehicle 9, the acceleration $\alpha_z$ lags behind the pitch rate $\omega_y$ by about 0.2 [s].

In this manner, it is recognized that the preceding/lagging relationship of the characteristic components represented by the acceleration $\alpha_z$ and the pitch rate $\omega_y$ or the time difference $\Delta T$ are different according to the installation position of the PND 1 of the vehicle 9.

Herein, from the general relationship between the time, the distance, and the velocity, the time difference $\Delta T$ becomes a value according to a distance (hereinafter, referred to as an installation distance D) from the installation position N1 where the PND 1 is installed to the central point WM of the wheel axis and a velocity of the vehicle 9 at this time.

In other words, if the installation distance D and the time difference $\Delta T$ are obtained, the PND 1 may calculate the velocity (hereinafter, referred to as a time differential velocity VT) of the vehicle 9 by performing a calculating process according to the following Equation (1).

[Equation 1]

$$VT = \frac{D}{\Delta T} \quad (1)$$

Figure 7A:
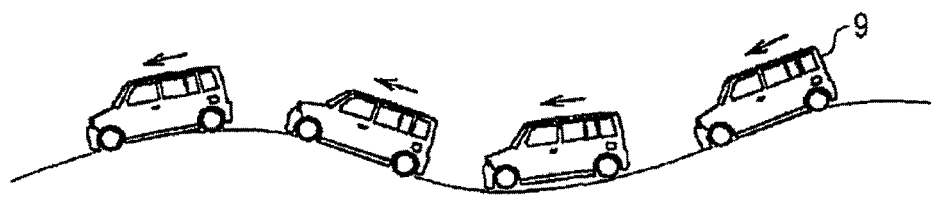
FIGS. 7A and 7B are schematic diagrams illustrating a moving direction of a vehicle.
Figure 7B:
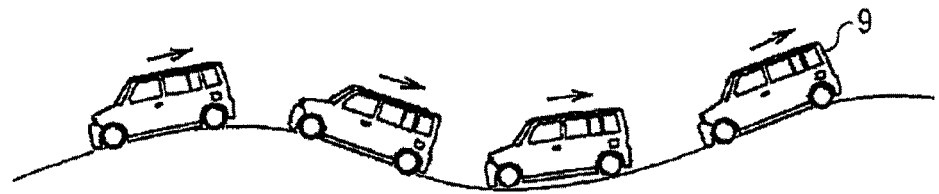

However, as illustrated in FIGS. 7A and 7B, the vehicle 9 may drive backwards as well as forwards.

Figure 8:
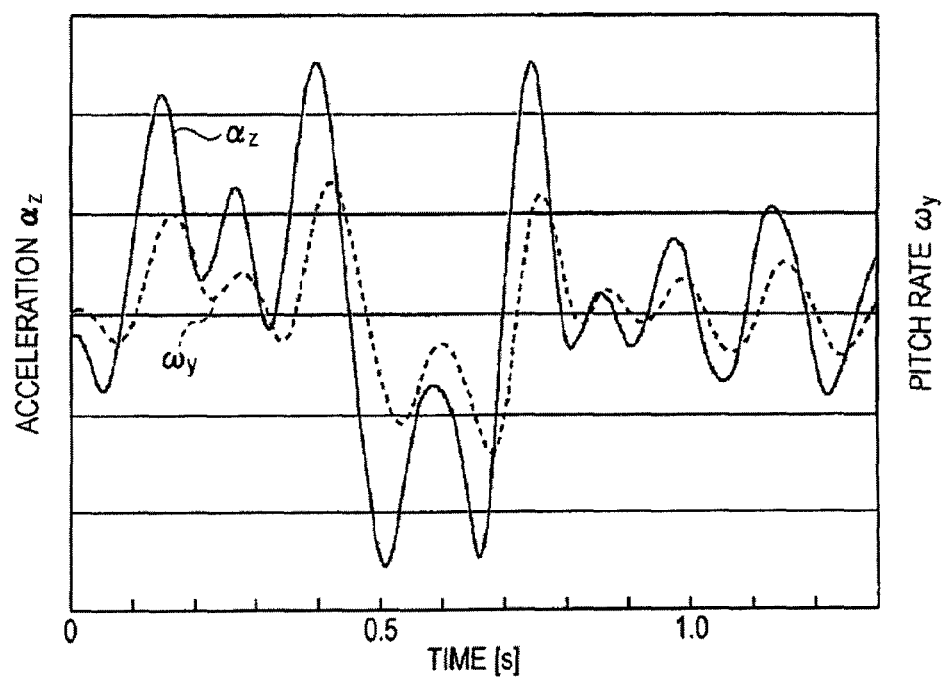
FIG. 8 is a schematic diagram illustrating measurement results of an acceleration and a pitch rate at the time of forward driving.
Figure 9:
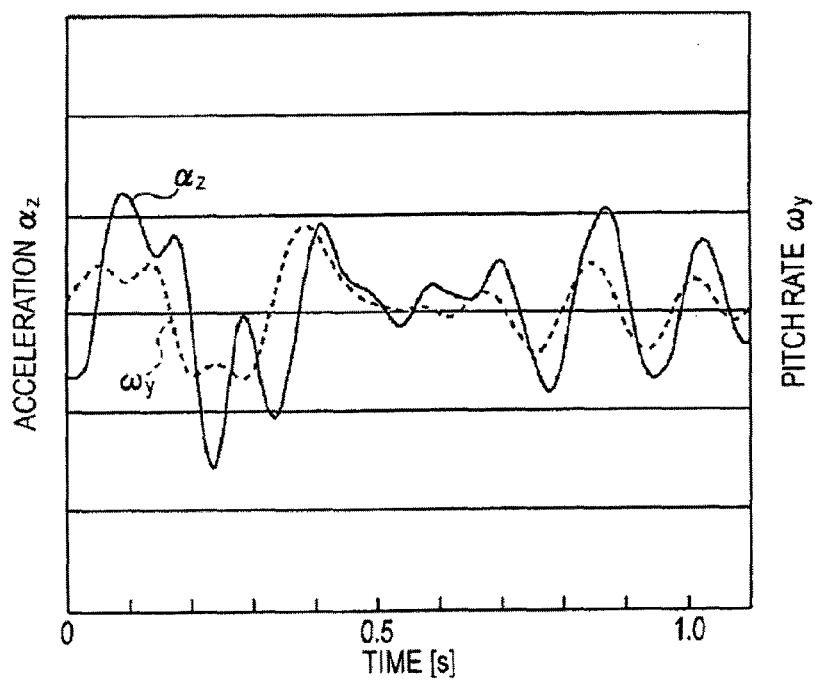
FIG. 9 is a schematic diagram illustrating measurement results of an acceleration and a pitch rate at the time of backward driving.

Herein, the vehicle 9 in which the PND 1 is installed at the front-side installation position N1 is allowed to drive forwards and backwards on an actual road, and the measurement results of the acceleration $\alpha_z$ and the pitch rate $\omega_y$ obtained in this case are illustrated as graphs in FIGS. 8 and 9.

It is understood from FIG. 8 that, in the case where the vehicle 9 where the PND 1 is installed at the front-side installation position N1 drives forwards, similarly to the case of FIG. 4, the acceleration $\alpha_z$ precedes the pitch rate $\omega_y$.

On the other hand, it is understood from FIG. 9 that, in the case where the vehicle 9 where the PND 1 is installed at the front-side installation position N1 drives backwards, similarly to the case of FIG. 6, that is, similarly to the case where the PND 1 is installed at the rear-side installation position N3 of the vehicle 9, the acceleration $\alpha_z$ lags behinds the pitch rate $\omega_y$.

From this relationship, if the installation position in the vehicle 9 is determined, the PND 1 may perceive the moving direction (forward direction or backward direction) of the vehicle 9 by determining the preceding/lagging relationship of the acceleration $\alpha_z$ and the pitch rate $\omega_y$, that is, by determining which one precedes or lags behind.

In this manner, in the present invention, the time differential velocity VT is calculated as the autoregulation velocity V of the vehicle 9 based on the installation distance D and the time difference $\Delta T$, and the moving direction of the vehicle 9 is perceived based on the preceding/lagging relationship between the acceleration $\alpha_z$ and the pitch rate $\omega_y$.

1-2-2. Current Position Calculation Principle

Now, a current position calculation principle of calculating the current position based on the autoregulation velocity V calculated by the aforementioned velocity calculation principle and the angular velocity of the Z axis rotation is described.

Figure 10:
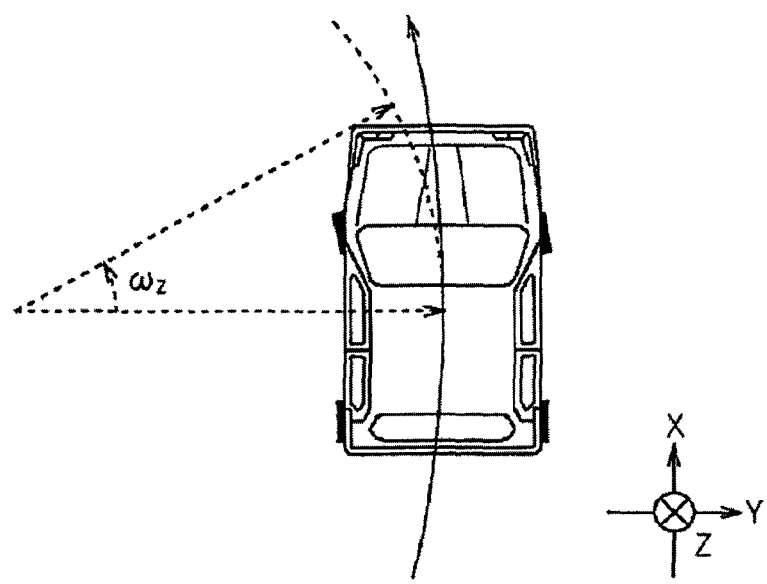
FIG. 10 is a schematic diagram illustrating a behavior at the time of curve driving.

As illustrated in FIG. 10, the PND 1 detects the angular velocity (hereinafter, referred to as a yaw rate) $\omega_z$ of the Z axis rotation of the time when the vehicle 9 turns, for example, to the left by using the Z axis gyro-sensor 6 (FIG. 3) in a predetermined sampling period (for example, 0.02 [s]).

Figure 11:
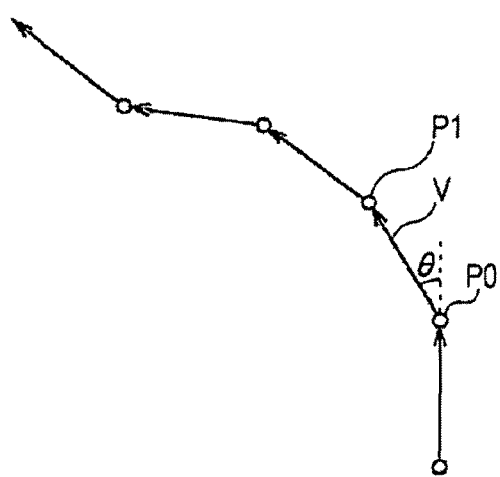
FIG. 11 is a schematic diagram illustrating calculation of a current position using an autoregulation velocity and an angle.

Next, as illustrated in FIG. 11, the PND 1 acquires a change amount from the previous position P0 to the current position P1 based on the autoregulation velocity V (time differential velocity VT) at the previous position P0 and the angle $\theta$ obtained by multiplying the yaw rate $\omega_z$ with the sampling period. The PND 1 is configured to calculate the current position P1 by adding the change amount to the previous position P0.

1-3. Circuit Configuration of PND

Figure 12:
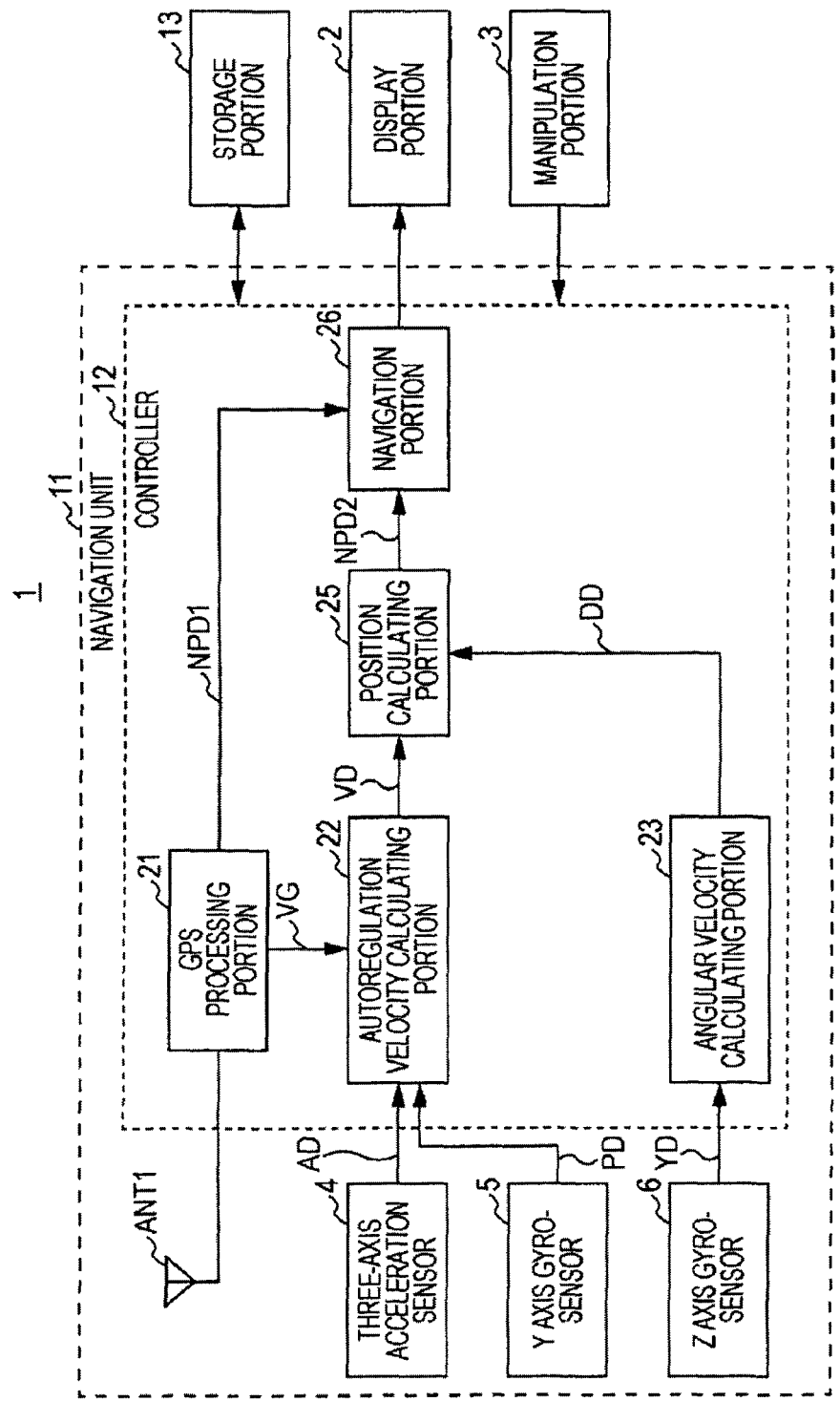
FIG. 12 is a schematic diagram illustrating a circuit configuration of a PND according to a first embodiment.

As illustrated in FIG. 12, the PND 1 is mainly configured to include a controller 12 and a navigation unit 11, in which various sensors are installed and a navigation function is implemented.

The controller 12 is configured with a CPU (central processing unit) to control the entire components by basic programs read from a storage portion 13, for example, a non-volatile memory or the like.

In addition, the controller 12 is configured to perform later-described velocity calculating process, current position calculating process, or the like according to various application programs read from the storage portion 13.

In addition, the PND 1 is configured to include a manipulation portion 3 configured with a touch panel or the like integrated with a display portion 2. If the manipulation portion 3 receives a manipulation command input by a user through the touch panel or the like, the manipulation portion 3 notifies the manipulation content to the controller 12.

The controller 12 is configured to perform a process according to the manipulation content of the user such as destination setting according to the manipulation content notified from the manipulation portion 3.

In the case of performing a navigation process, the controller 12 is configured to function as a GPS processing portion 21, an autoregulation velocity calculating portion 22, an angle calculating portion 23, a position calculating portion 25, and a navigation portion 26.

The controller 12 is configured so that, in the case where the controller 12 receives a GPS signal from a GPS satellite, the GPS processing portion 21 is allowed to perform a GPS positioning process of measuring a position based on the GPS signal.

In other words, the PND 1 transmits the GPS signals received through a GPS antenna ANT1 from a plurality of the GPS satellites to the GPS processing portion 21 of the controller 12.

The GPS processing portion 21 acquires current position data NPD1 by accurately measuring the current position of the vehicle 9 based on trajectory data obtained through demodulation of a plurality of the GPS signals and distance data from the plurality of the GPS satellites to the vehicle 9 and transmits the current position data NPD1 to the navigation portion 26.

In addition, the GPS processing portion 21 calculates a velocity (hereinafter, referred to as a GPS velocity VG) of the vehicle 9 based on the past and current position data NPD1 and transmits the GPS velocity VG to the autoregulation velocity calculating portion 22.

On the other hand, in the case where the PND 1 may not receive the GPS signal from the GPS satellites, the PND 1 may not perform the GPS positioning process. Therefore, the PND 1 is also configured so that, in the case where the PND 1 may not mainly receive the GPS signal, the PND 1 may perform an autoregulation positioning process of calculating the autoregulation velocity V based on the detection values of various sensors and, after that, calculating the current position.

More specifically, the PND 1 is configured to calculate a time differential velocity VT based on the aforementioned calculation principle by using the autoregulation velocity V.

In other words, the three-axis acceleration sensor 4 detects the accelerations $\alpha_x$, $\alpha_y$, and $\alpha_z$ by using a sampling frequency of, for example, 50 [Hz] and transmits acceleration data AD representing the acceleration $\alpha_z$ among the accelerations $\alpha_x$, $\alpha_y$, and $\alpha_z$ to the autoregulation velocity calculating portion 22 of the controller 12.

The Y axis gyro-sensor 5 detects the pitch rate $\omega_y$ by using a sampling frequency of, for example, 50 [Hz] and transmits pitch rate data PD representing the pitch rate $\omega_y$ to the autoregulation velocity calculating portion 22 of the controller 12.

The autoregulation velocity calculating portion 22 calculates the time differential velocity VT at a rate of 50 times per second by using Equation (1) based on the acceleration $\alpha_z$ corresponding to the acceleration data AD supplied from the three-axis acceleration sensor 4 and the pitch rate $\omega_y$ corresponding to the pitch rate data PD supplied from the Y axis gyro-sensor 5 (described later in detail).

Sequentially, the autoregulation velocity calculating portion 22 sets the time differential velocity VT as the autoregulation velocity V and transmits the autoregulation velocity data VD representing the autoregulation velocity V to the position calculating portion 25.

In addition, the Z axis gyro-sensor 6 detects the yaw rate $\omega_z$ in a sampling frequency of, for example, 50 [Hz] and transmits yaw rate data YD representing the yaw rate $\omega_z$ to the angle calculating portion 23 of the controller 12.

The angle calculating portion 23 calculates the angle θ at the time when the vehicle 9 turns to the right or to the left by multiplying the yaw rate $\omega_z$ corresponding to the yaw rate data YD supplied from the Z axis gyro-sensor 6 with the sampling period (0.02 [s]) and transmits angle data DD representing the angle θ to the position calculating portion 25.

The position calculating portion 25 obtains a change amount from the previous position P0 to the current position P1 based on the autoregulation velocity V corresponding to the autoregulation velocity data VD supplied from the autoregulation velocity calculating portion 22 and the angle θ corresponding to the angle data DD supplied from the angle calculating portion 23 as illustrated in FIG. 11.

Next, the position calculating portion 25 calculates the current position P1 by adding the change amount to the previous position P0 and transmits current position data NPD2 representing the current position P1 to the navigation portion 26.

The navigation portion 26 reads vicinity map data including the current position of the vehicle 9 from the storage portion 13 based on the current position data NPD1 supplied from the GPS processing portion 21 or the current position data NPD2 supplied from the position calculating portion 25.

Next, the navigation portion 26 generates a map image including the current position and outputs the map image to the display portion 2 so as to display the map image.

In this manner, the PND 1 is configured to generate the vicinity map image including the current position of the vehicle 9 by using the current position data NPD1 obtained based on the GPS signals or the current position data NPD2 generated based on the detection values of various sensors and to display the map image to the display portion 2.

1-4. Velocity Calculating Process

Next, a velocity calculating process of the autoregulation velocity calculating portion 22 which calculates the time differential velocity VT based on the acceleration $\alpha_z$ corresponding to the acceleration data AD supplied from the three-axis acceleration sensor 4 and the pitch rate $\omega_y$ corresponding to the pitch rate data PD supplied from the Y axis gyro-sensor 5 is described.

Figure 13:
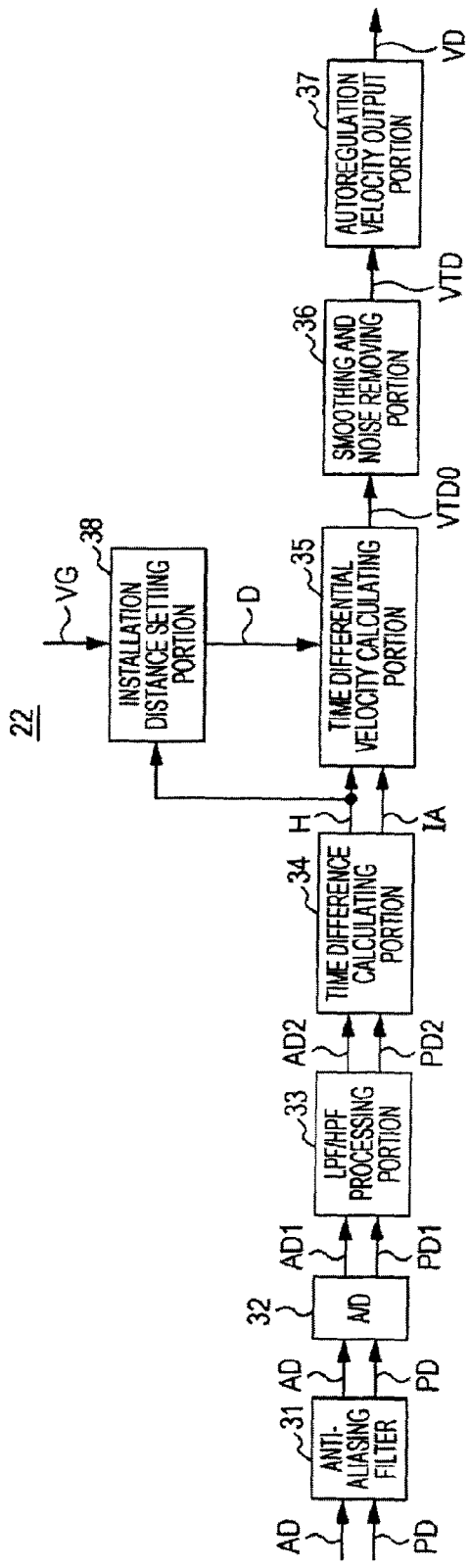
FIG. 13 is a schematic diagram illustrating a configuration of an autoregulation velocity calculating portion according to the first embodiment.

As illustrated in FIG. 13, when the autoregulation velocity calculating portion 22 performs the velocity calculating process, the autoregulation velocity calculating portion 22 functions as an anti-aliasing filter 31, an analog/digital (A/D) converter 32, a lowpass filter/high pass filter (LPF/HPF) processing portion 33, a time difference calculating portion 34, a time differential velocity calculating portion 35, a smoothing filter 36, an autoregulation velocity output portion 37, and an installation distance setting portion 38.

The autoregulation velocity calculating portion 22 supplies the acceleration data AD supplied from the three-axis acceleration sensor 4 and the pitch rate data PD supplied from the Y axis gyro-sensor 5 to the anti-aliasing filter 32.

The anti-aliasing filter 31 removes the frequency components of which the frequency is larger than the half of the sampling frequency (50 [Hz]) of the A/D converter 33 from the acceleration data AD and the pitch rate data PD and transmits the acceleration data AD and the pitch rate data PD to the A/D converter 32.

The A/D converter 32 converts analog signals of the acceleration data AD and the pitch rate data PD into digital signals in the sampling frequency of 50 [Hz] and supplies the generated acceleration data AD1 and the generated pitch rate data PD1 to the LPF/HPF processing portion 33.

The LPF/HPF processing portion 33 removes the DC components and the high-frequency band components of the acceleration data AD1 and the pitch rate data PD1 and supplies the generated acceleration data AD2 and the generated pitch rate data PD2 to the time difference calculating portion 34.

The time difference calculating portion 34 calculates the time difference ΔT between occurrence times of the corresponding characteristic components based on the acceleration data AD2 and the pitch rate data PD2.

Herein, the time difference calculating portion 34 is configured to calculate the time difference ΔT by using the correlation between the acceleration $\alpha_z$ represented by the acceleration data AD2 and the pitch rate $\omega_y$ represented by the pitch rate data PD2 and to transmit the time difference to the time differential velocity calculating portion 35 (as described later in detail)

In addition, the time difference calculating portion 34 is configured to generate precedence information IA indicating which one of the acceleration $\alpha_z$ and the pitch rate $\omega_y$ precedes and to transmit the precedence information IA to the time differential velocity calculating portion 35.

The time differential velocity calculating portion 35 calculates the time differential velocity VT by inserting the time difference ΔT supplied from the time difference calculating portion 34 and the installation distance D (the calculating process being described later) into the aforementioned Equation (1). In addition, the time differential velocity calculating portion 35 determines based on the precedence information 1A whether the moving direction of the vehicle 9 is the forward direction or the backward direction and sets the sign of the time differential velocity VT to positive (forward driving) or negative (backward driving) according to the determination result. In addition, the time differential velocity calculating portion 35 transmits time differential velocity data VTD0 representing the time differential velocity VT to the smoothing and noise removing portion 36.

The smoothing and noise removing portion 36 reduces the error included in the time differential velocity VT by performing predetermined smoothing and noise removing processes on the time differential velocity data VTD0 supplied from the time differential velocity calculating portion 35 and transmits the obtained time differential velocity data VTD to the autoregulation velocity output portion 37.

The autoregulation velocity output portion 37 compares the time differential velocity data VTD supplied from the smoothing and noise removing portion 36 with a predetermined minimum power threshold value THL.

Herein, the minimum power threshold value THL is set to, for example, 3 [km/h]. When the time differential velocity data VT is less than the minimum power threshold value THL, in the actual case, the vehicle 9 does not move but stop, so that it may be considered that the time differential velocity data VT is highly likely to be a value based on the error detection or the like of the acceleration sensor 4 or the like.

Therefore, if the time differential velocity data VTD is less than the minimum power threshold value THL, the autoregulation velocity output portion 37 replaces the time differential velocity data VTD with the value of "0" and transmits the time differential velocity data VTD as the autoregulation velocity data VD to the position calculating portion 25 (FIG. 12).

In this manner, the autoregulation velocity calculating portion 22 is configured to calculate the time difference $\Delta T$ by using the correlation between the acceleration $\alpha_z$ and the pitch rate $\omega_y$ and to calculate the time differential velocity VT according to the following Equation (1).

1-4-1. Time Difference Calculating Process

Next, a time difference ($\Delta T$) calculating process of the time difference calculating portion 34 is described. The time difference calculating portion 34 is configured to sequentially store in the storage portion 13 (FIG. 12) the acceleration $\alpha_z$ (acceleration data AD2) and the pitch rate $\omega_y$ (pitch rate data PD2) supplied from the LPF/HPF processing portion 33 in every sampling period.

Sequentially, the time difference calculating portion 34 reads the acceleration $\alpha_z$ obtained in the past calculation period CP (for example, within past 1 [s]) with respect to the current time point from the storage portion 13 and calculates a standard deviation $\sigma_\alpha$ of the acceleration $\alpha_z$ according to the following Equation (2).

[Equation 2]

$$\sigma_a = \sqrt{\frac{n\sum_{j=1}^{n}\alpha_{zj}^2 - \left(\sum_{j=1}^{n}\alpha_{zj}\right)^2}{n^2}} \quad (2)$$

In addition, in Equation (2), the number of accelerations $\alpha_z$ obtained in the calculation period CP is denoted by n, and the accelerations $\alpha_z$ obtained in the calculation period are denoted by $\alpha_{z1}, \alpha_{z2}, \ldots,$ and $\alpha_{zn}$ for the convenience.

In addition, the time difference calculating portion 34 reads the pitch rate $\omega_y$ obtained in the calculation period CP with respect to the current time point from the storage portion 13 and calculates a standard deviation $\sigma_\omega$ of the pitch rate $\omega_y$ according to the following Equation (3).

[Equation 3]

$$\sigma_\omega = \sqrt{\frac{n\sum_{j=1}^{n}\omega_{yj}^2 - \left(\sum_{j=1}^{n}\omega_{yj}\right)^2}{n^2}} \quad (3)$$

In addition, in Equation (3), similarly to Equation (2), the number of pitch rates $\omega_y$ obtained in the calculation period CP is denoted by n, and the pitch rates $\omega_y$ obtained in the calculation period are denoted by $\omega_{y1}, \omega_{y2}, \ldots,$ and $\omega_{yn}$ for the convenience.

In addition, the time difference calculating portion 34 calculates average values $\mu_\alpha$ and $\mu_\omega$ of the acceleration $\alpha_z$ and the pitch rate $\omega_y$ read from the storage portion 13.

Sequentially, the time difference calculating portion 34 calculates covariance $\text{cov}(\alpha_z, \omega_y)$ of the acceleration $\alpha_z$ and the pitch rate $\omega_y$ by using the standard deviations $\sigma_\alpha$ and $\sigma_\omega$ and the average values $\mu_\alpha$ and $\mu_\omega$ of the acceleration $\alpha_z$ and the pitch rate $\omega_y$ according to the following Equation (4).

[Equation 4]

$$\text{cov}(\alpha_z, \omega_y) = \sum_{j=1}^{n}\frac{1}{n}(\alpha_z - \mu_\alpha)(\omega_y - \mu_\omega) \quad (4)$$

Next, the time difference calculating portion 34 calculates the intercorrelation $\rho_{\alpha,\omega}$ between the acceleration $\alpha_z$ and the pitch rate $\omega_y$ by using the covariance $\text{cov}(\alpha_z, \omega_y)$ and the standard deviations $\sigma_\alpha$ and $\sigma_\omega$ according to the following Equation (5).

[Equation 5]

$$\rho_{u,\omega} = \frac{\text{cov}(\alpha_z \cdot \omega_y)}{\sigma_u \cdot \sigma_\omega} \quad (5)$$

Herein, the intercorrelation $\rho_{\alpha,\omega}$ is a high value according to the strength of the correlation between the acceleration $\alpha_z$ and the pitch rate $\omega_y$ in the calculation period CP at that time.

In other words, the value of the intercorrelation $\rho_{\alpha,\omega}$ may be increased by appropriately shifting the waveform of the acceleration $\alpha_z$ or the pitch rate $\omega_y$ in the direction of time axis.

Herein, generally, in many cases, the PND 1 is installed at the front side in the vehicle room of the vehicle 9 and the vehicle 9 drives forwards. Namely, it may be considered that the acceleration $\alpha_z$ is likely to precede the pitch rate $\omega_y$.

Therefore, the time difference calculating portion 34 sequentially calculates the intercorrelations $\rho_{\alpha,\omega}$ while shifting the waveform of the acceleration $\alpha_z$ to the past by one sampling period (for example, 0.02 [s]) over a predetermined movement range (for example, 0.4 [s]) and stores the intercorrelations $\rho_{\alpha,\omega}$ in correspondence with the shift amounts H of this time in the storage portion 13 (FIG. 12).

However, actually, there may be considered a case where the vehicle 9 drives backwards or a case the PND 1 is installed at the rear side in the vehicle room of the vehicle 9. In other words, there may be a case where the pitch rate $\omega_y$ precedes the acceleration $\alpha_z$.

Therefore, in the case where the maximum value of the intercorrelations $\rho_{\alpha,\omega}$ calculated while shifting the acceleration $\alpha_z$ to the past is less than a predetermined threshold value, the time difference calculating portion 34 determines that the vehicle 9 drives backwards or that the PND 1 is installed at the rear side in the vehicle room of the vehicle 9.

In addition, the time difference calculating portion 34 returns the waveform of the acceleration $\alpha_z$ to the initial state, sequentially calculates the intercorrelations $\rho_{\alpha,\omega}$ while shifting the waveform of the pitch rate $\omega_y$ by one sampling period to the past over the movement range and stores the intercorrelations $\rho_{\alpha,\omega}$ in correspondence with the shift amounts H at this time in the storage portion 13.

Next, the time difference calculating portion 34 selects the shift amount H of the time when the intercorrelation $\rho_{\alpha,\omega}$ stored in the storage portion 13 is highest.

Herein, the shift amount H at the time of calculating the intercorrelation $\rho_{\alpha,\omega}$ is a discrete value every sampling interval. However, the shift amount H for obtaining the highest intercorrelation $\rho_{\alpha,\omega}$ is not limited to the discrete value every sampling interval, but it is likely to be a middle value.

Figure 14:
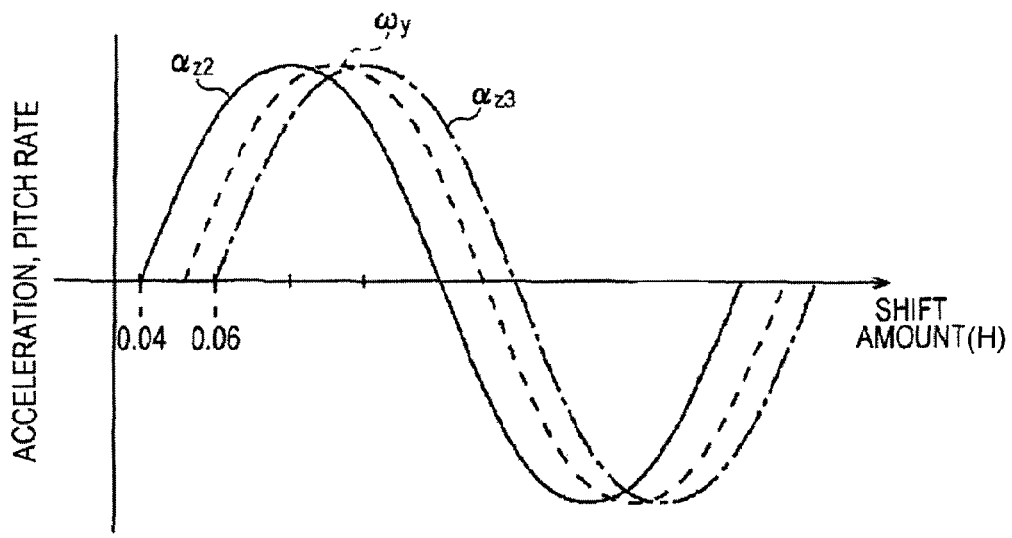
FIG. 14 is a schematic diagram illustrating a relationship between a discrete shift amount and waveforms of an acceleration and a pitch rate.

For example, as illustrated in FIG. 14, there may be considered a case where the pitch rate $\omega_y$ is located at a middle point between the accelerations $\alpha_{z2}$ and $\alpha_{z3}$ of the times when the shift amount H are predetermined shift amounts H2 and H3.

Therefore, the time difference calculating portion 34 is configured to express the value of intercorrelation $\rho_{\alpha,\omega}$ as a function and to calculate shift amount H of the time when the value of the intercorrelation $\rho_{\alpha,\omega}$ is maximized based on the function with the accuracy that is finer than the sampling interval.

More specifically, the time difference calculating portion 34 changes the value of the intercorrelation $\rho_{\alpha,\omega}$ to be a quadratic function using the coefficients a and b and a constant c as expressed by the following Equation (6).

[Equation 6]

$$\rho_{\alpha,\omega}=aH^2+bH+c \qquad (6)$$

Therefore, the time difference calculating portion 34 generates simultaneous equations by inserting the values of the intercorrelation $\rho_{\alpha,\omega}$ and the shift amount H in Equation (6) with respect to three points, that is, the point where the value of the intercorrelation $\rho_{\alpha,\omega}$ is maximized and the prior and later points and specifies the coefficients and constant in the quadratic function of Equation (6) by solving the simultaneous equations.

Sequentially, when the slope of the quadratic function is "0", that is, when the value of Equation (7) obtained by differentiating Equation (6) with respect to the shift amount H is "0", the time difference calculating portion 34 sets the value of the intercorrelation $\rho_{\alpha,\omega}$ to the maximum.

[Equation 7]

$$\rho_{\alpha,\omega}=2aH+b \qquad (7)$$

More specifically, the time difference calculating portion 34 calculates the shift amount H by inserting the values of the coefficients a and b into Equation (8) which is obtained by converting the value of Equation (7) using "0".

[Equation 8]

$$H=-\frac{b}{2a} \qquad (8)$$

In this manner, the calculated shift amount H is a value so that the value of Equation (7) becomes "0", that is, so that the value of the intercorrelation $\rho_{\alpha,\omega}$ of Equation (6) is maximized. Therefore, the time difference calculating portion 34 sets the calculated shift amount H as the time difference $\Delta T$ and transmits the time difference $\Delta T$ to the time differential velocity calculating portion 35 (FIG. 13).

Figure 15:
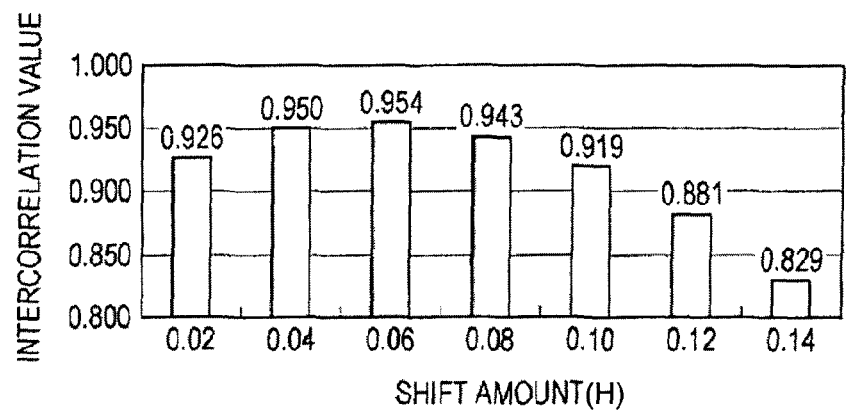
FIG. 15 is a schematic diagram illustrating a relationship between a shift amount and an intercorrelation value.

For example, as illustrated in FIG. 15, it is assumed that, when the shift amount H is 0.02, 0.04, 0.06, . . . , and 0.14 [s], the value of the intercorrelation $\rho_{\alpha,\omega}$ is 0.926, 0.950, 0.954, 0.943, . . . , and 0.829, respectively.

In this case, when the shift amount H is 0.06 [s], the value of the intercorrelation $\rho_{\alpha,\omega}$ is maximized. Therefore, the time difference calculating portion 34 generates simultaneous equations by inserting the values of the intercorrelation $\rho_{\alpha,\omega}$ corresponding to the shift amount H being 0.04, 0.06, and 0.08 [s] into Equation (6) and obtains coefficients a and b and a constant c by solving the simultaneous equations.

Sequentially, the time difference calculating portion 34 calculates the shift amount H=0.0553 [s] by inserting the obtained coefficients a and b into Equation (8) and sets the shift amount H as the time difference $\Delta T$.

In addition, the time difference calculating portion 34 generates the precedence information IA indicating which one of the acceleration $\alpha z$ and the pitch rate $\omega y$ the waveform of the side of which the value of the intercorrelation $\rho\alpha, \omega$ shifted to the past when the value of the intercorrelation $\rho\alpha, \omega$ is maximized, that is, the waveform of the preceding side corresponds to.

In this manner, the time difference calculating portion 34 calculates the shift amount H so that the intercorrelation $\rho_{\alpha,\omega}$ between the acceleration $\alpha_z$ and the pitch rate $\omega_y$ is maximized and sets the shift amount H as the time difference $\Delta T$.

1-4-2. Installation Distance Setting

As described above with respect to Equation (1), the PND 1 may calculate the velocity (that is, the time differential velocity VT) of the vehicle 9 by dividing the installation distance D with the time difference $\Delta T$.

In the case where the velocity of the vehicle 9 and the time difference $\Delta T$ are clarified, the PND 1 may reversely calculate the installation distance D by using the velocity of the vehicle 9 and the time difference $\Delta T$ from the aforementioned relationship. In addition, with respect to the velocity of the vehicle 9, in the case where the GPS processing portion 21 (FIG. 12) may receive the GPS signal, the GPS velocity VG may be set to the velocity of the vehicle 9.

Therefore, in the case where the GPS velocity VG is supplied from the GPS processing portion 21, the installation distance setting portion 38 of the autoregulation velocity calculating portion 22 calculates the installation distance D based on the GPS velocity VG and the time difference $\Delta T$ supplied from the time difference calculating portion 34 according to the following Equation (9).

[Equation 9]

$$D=VG \cdot \Delta T \qquad (9)$$

In addition, the installation distance setting portion 38 may also compare the sign (positive or negative) of the GPS velocity VG with the precedence information IA to determine which of the front side and the rear side of the vehicle 9 the PND 1 is installed at.

In other words, in the case where the GPS velocity VG is positive and the precedence information IA indicates that the acceleration $\alpha_z$ precedes (vehicle 9 is driving forwards) or in the case where the GPS velocity VG is negative and the precedence information IA indicates that the pitch rate $\omega_y$ precedes (vehicle 9 is driving backwards), the installation distance setting portion 38 determines that the PND 1 is installed at the front side of the vehicle 9.

In addition, in the case where the GPS velocity VG is positive and the precedence information IA indicates that the pitch rate $\omega_y$ precedes (vehicle 9 is driving forwards), or in the case where the GPS velocity VG is negative and the precedence information IA indicates that the acceleration $\alpha_z$ precedes (vehicle 9 is driving backwards), the installation distance setting portion 38 determines that the PND 1 is installed at the rear side of the vehicle 9.

In addition, in the case where the PND 1 is determined to be installed at the front side of the vehicle 9, the installation distance setting portion 38 sets the sign of the installation distance D to be positive, and in the case where the PND 1 is determined to be installed at the rear side of the vehicle 9, the installation distance setting portion 38 sets the sign of the installation distance D to be negative.

In addition, the installation distance setting portion 38 is configured to calculate the installation distance D at any time and to store the calculated installation distance D in the storage portion 13 (FIG. 12). In addition, the installation distance setting portion 38 is configured to supply the latest installation distance D, which is read from the storage portion 13, to the time differential velocity calculating portion 35 in the case where the GPS velocity VG is not supplied from the GPS processing portion 21.

In addition, in the case where the value of the installation distance D is input by user's manipulation, the installation distance setting portion 38 is configured to store the value in the storage portion 13 and to supply the value to the time differential velocity calculating portion 35.

1-4-3. Moving Direction Determining Process

The time differential velocity calculating portion 35 recognizes based on the precedence information IA which one of the acceleration $\alpha_z$ and the pitch rate $\omega_y$ precedes.

In addition, the time differential velocity calculating portion 35 recognizes based on the sign of the installation distance D which one of the front side and the rear side of the vehicle 9 the PND 1 is installed at.

Herein, in the case where the acceleration $\alpha_z$ precedes and the PND 1 is installed at the front side of the vehicle 9 (FIG. 8) and in the case where the pitch rate $\omega_y$ precedes and the PND 1 is installed at the rear side of the vehicle 9, the vehicle 9 is configured to drive forwards based on the aforementioned basic principles.

On the other hand, in the case where the pitch rate $\omega_y$ precedes and the PND 1 is installed at the front side of the vehicle 9 (FIG. 9) and in the case where the acceleration $\alpha_z$ precedes and the PND 1 is installed at the rear side of the vehicle 9, the vehicle 9 is configured to drive backwards based on the aforementioned basic principles.

Therefore, the time differential velocity calculating portion 35 determines the moving direction of the vehicle 9 based on the signs of the precedence information IA and the installation distance D. In addition, the time differential velocity calculating portion 35 set the sign of the time differential velocity VT calculated according to Equation (1) based on the moving direction of the vehicle 9. Namely, if the moving direction is the forward direction, the sign is set to positive, and if the moving direction is the backward direction, the sign is set to negative.

Figure 16:
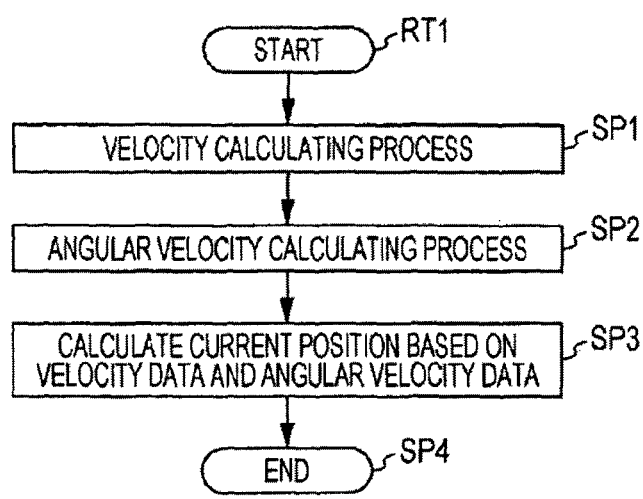
FIG. 16 is a flowchart illustrating a current position calculating process procedure.
Figure 17:
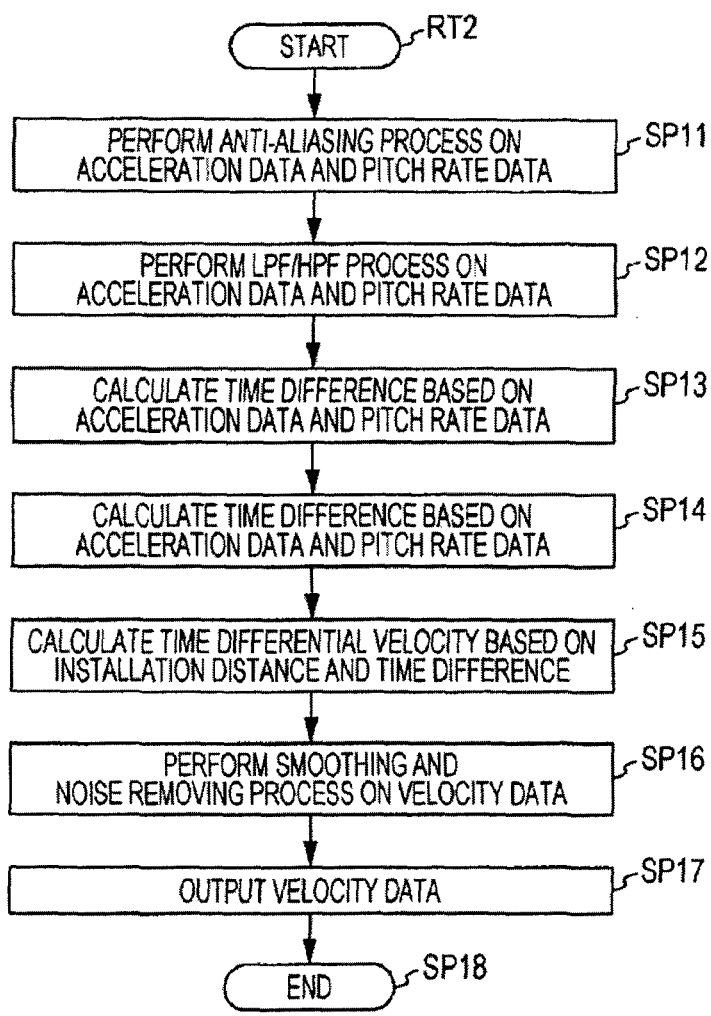
FIG. 17 is a flowchart illustrating a velocity calculating process procedure.
Figure 18:
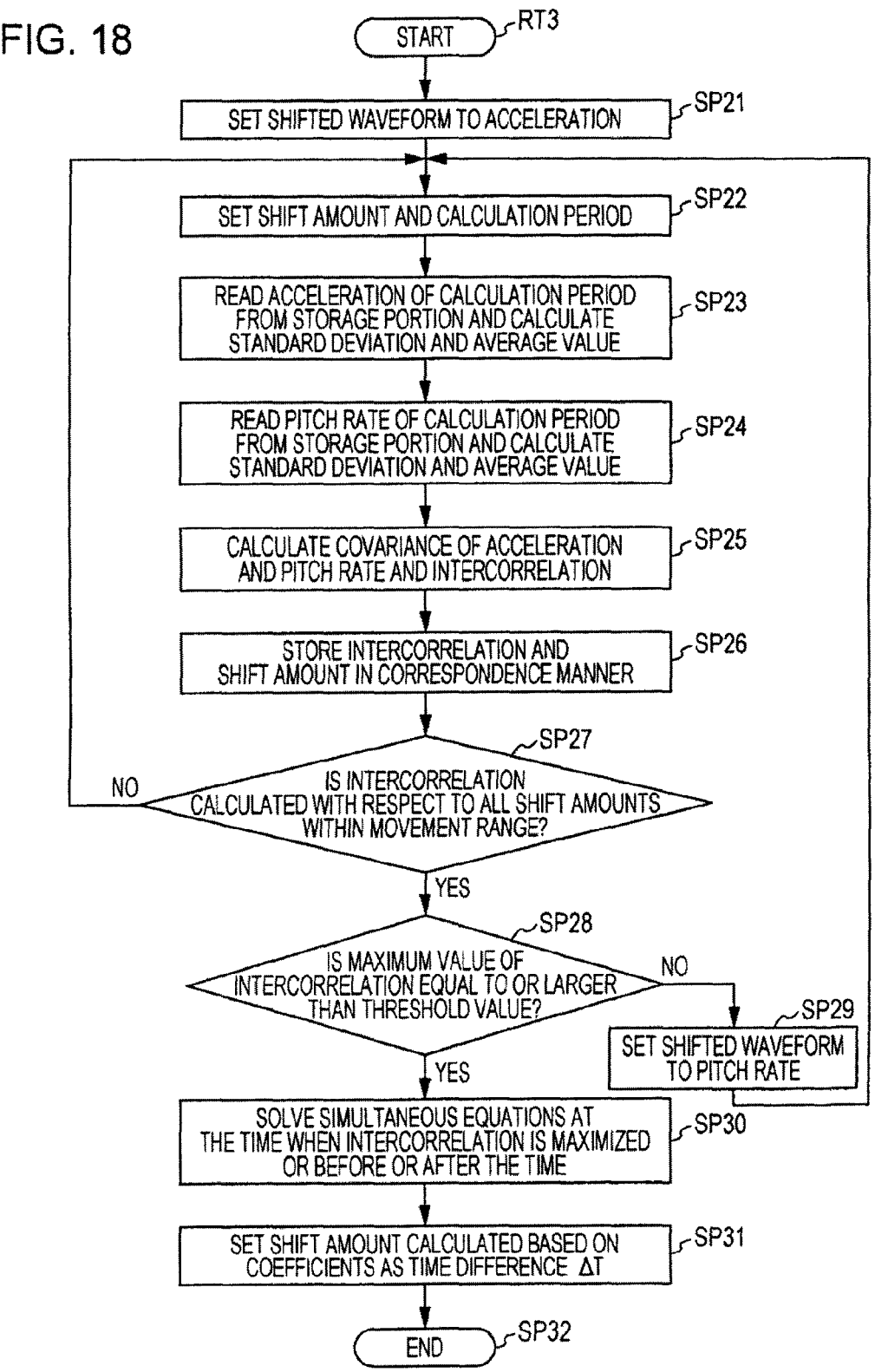
FIG. 18 is a flowchart illustrating a time difference calculating process procedure.

1-5. Position Calculating Process Procedure and Velocity Calculating Process Procedure Now, a position calculating process procedure and a velocity calculating process procedure are described with reference to flowcharts of FIGS. 16, 17, and 18.

When the power is on, the controller 12 of the PND 1 starts a position calculating process routine RT1 (FIG. 16), and the procedure proceeds to Step SP1. In Step SP1, the controller 12 allows the autoregulation velocity calculating portion 22 to calculate the time differential velocity VT.

At this time, the controller 12 starts a velocity calculating process routine RT2 (FIG. 17), and the procedure proceeds to Step SP11. In Step SP11, the controller 12 allows the anti-aliasing filter 31 of the autoregulation velocity calculating portion 22 to perform an anti-aliasing process on the acceleration data AD detected by the three-axis acceleration sensor 4 and the pitch rate data PD detected by the Y axis gyro-sensor 5, and the procedure proceeds to the next Step SP12.

In Step SP12, the controller 12 allows the A/D converter 32 to perform an A/D converting process on the acceleration data AD and the pitch rate data PD to generate acceleration data AD1 and pitch rate data PD1, and the procedure proceeds to the next Step SP13.

In Step SP13, the controller 12 allows the LPF/HPF processing portion 33 to remove the DC components and the high-frequency band components from the acceleration data AD1 and the pitch rate data PD1 to generate acceleration data AD2 and pitch rate data PD2, and the procedure proceeds to the next Step SP14.

In Step SP14, the controller 12 allows the time difference calculating portion 34 to calculate a time difference $\Delta T$ based on the acceleration data AD2 and the pitch rate data PD2.

At this time, the controller 12 starts a time difference calculating process routine RT3 (FIG. 18), and the procedure proceeds to Step SP21. In Step SP21, the controller 12 sets a shifting waveform as the acceleration $\alpha_z$ in the later process, and the procedure proceeds to the next Step SP22.

In Step SP22, the controller 12 sets a shift amount H and a calculation period CP based on the shift amount H, and the procedure proceeds to the next Step SP23.

In Step SP23, the controller 12 reads an acceleration $\alpha_z$ in the calculation period CP from the storage portion 13 and calculates a standard deviation $\sigma_\alpha$ and an average value $\mu_\alpha$ by using Equation (2), and the procedure proceeds to the next Step SP24.

In Step SP24, the controller 12 reads a pitch rate $\omega_y$ in the calculation period CP from the storage portion 13 and calculates a standard deviation $\sigma_\omega$ and an average value $\mu_\omega$ by using Equation (3), and the procedure proceeds to the next Step SP25.

In Step SP25, the controller 12 calculates covariance cov $(\alpha_z, \omega_y)$ of the acceleration $\alpha_z$ and the pitch rate $\omega_y$ according to Equation (4), calculates intercorrelation $\rho_{\alpha, \omega}$ between the acceleration $\alpha_z$ and the pitch rate $\omega_y$ according to Equation (5) and proceeds to the next Step SP26.

In Step SP26, the controller 12 stores the intercorrelation $\rho_{\alpha, \omega}$ in correspondence with the shift amount H of the time in the storage portion 13 and proceeds to the next Step SP27.

In Step SP27, the controller 12 determines whether or not the intercorrelations $\rho_{\alpha, \omega}$ with respect to all the shift amounts H in the moving range are calculated. If the negative result is obtained, the controller 12 returns to Step SP22 to calculate the intercorrelations $\rho_{\alpha, \omega}$ with respect to the remaining shift amounts H.

On the other hand, in Step SP27, if the affirmative result is obtained, the controller 12 proceeds to the next Step SP28.

In Step SP28, the controller 12 determines whether or not the maximum value of the intercorrelation $\rho_{\alpha, \omega}$ is equal to or larger than the threshold value. If the negative result is obtained, it denotes that the waveform of the pitch rate $\omega_y$ is likely to precede the waveform of the acceleration $\alpha_z$. At this time, the controller 12 proceeds to the next Step SP29.

In Step SP29, the controller 12 sets the shifting waveform as the pitch rate $\omega_y$ and returns to Step SP22 to shift the waveform of the pitch rate $\omega_y$ and to calculate the intercorrelation $\rho_{\alpha, \omega}$.

On the other hand, in Step SP28, if the affirmative result is obtained, it denotes that all the intercorrelations $\rho_{\alpha, \omega}$ necessary for calculating the time difference $\Delta T$ are calculated. At this time, the controller 12 proceeds to the next Step SP30.

In Step SP30, the controller 12 generates simultaneous equations by inserting the values of the intercorrelation $\rho_{\alpha, \omega}$ and the shift amount H in Equation (6) with respect to three points, that is, the point where the value of the intercorrelation $\rho_{\alpha, \omega}$ is maximized and the prior and later points and calculate the coefficients a and b by solving the simultaneous equations. The controller 12 proceeds to the next Step SP31.

In Step SP31, the controller 12 calculates the shift amount H by inserting the calculated coefficients a and b into Equation (8), sets the shift amount H as the time difference $\Delta T$, and proceeds to the next Step SP32. In Step SP32, the controller 12 ends the time difference calculating process routine RT3 and returns to the initial velocity calculating process procedure RT2 (FIG. 17) to proceed to Step SP15.

In Step SP15, the controller 12 allows the velocity calculating portion 35 to calculate a time differential velocity VT based on the time difference $\Delta T$ and the installation distance D to generate velocity data VTD0 and proceeds to the next Step SP16.

In Step SP16, the controller 12 allows the smoothing and noise removing portion 36 to perform smoothing and noise removing processes on the velocity data VTD0 to generate velocity data VTD and proceeds to the next Step SP17.

In Step SP17, if the time differential velocity VT is less than 3 [km/h], the controller 12 allows the velocity output portion 37 to correct the velocity data VTD as the value of 0 and to output the velocity data VTD as the autoregulation velocity data VD and proceeds to the next Step SP18.

In Step SP18, the controller 12 ends the velocity calculating process routine RT2 and returns to the initial position calculating process routine RT1 (FIG. 16) to proceed to Step SP2.

In Step SP2, the controller 12 allows the angle calculating portion 23 calculates an angle θ by multiplying the yaw rate $\omega_z$ corresponding to the yaw rate data YD with the sampling period to generate angular velocity data DD and proceeds to the next Step SP3.

In Step SP3, the controller 12 allows the position calculating portion 25 to calculate current position data NPD2 based on the autoregulation velocity data VD and the angle data DD and to supply the current position data NPD2 to the navigation portion 26 (FIG. 12). The controller 12 proceeds to the next Step SP4 to end the position calculating process routine RT1.

1-6. Velocity Calculation Result

Figure 19:
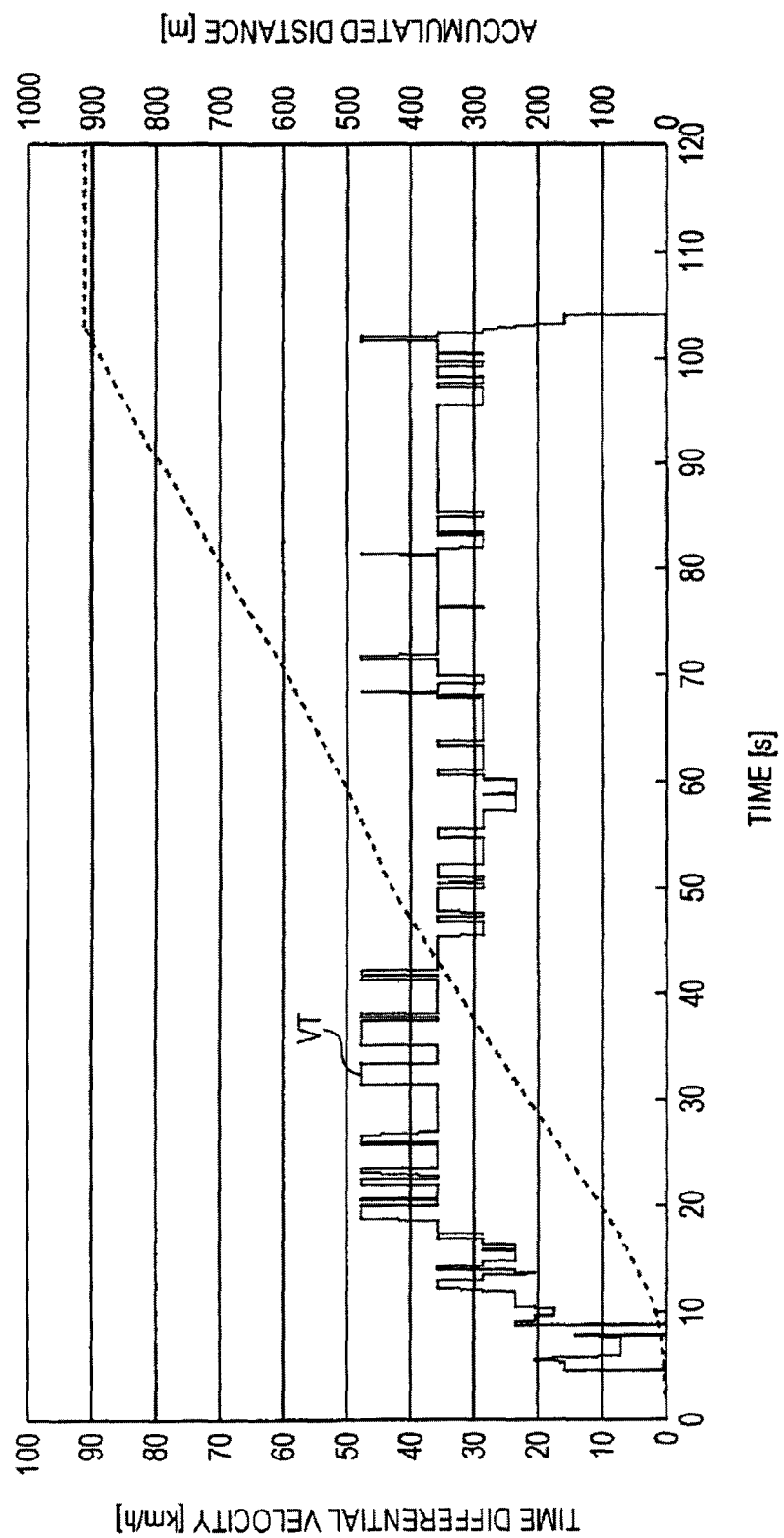
FIG. 19 is a schematic diagram illustrating a calculation result of a time differential velocity.

Now, FIG. 19 illustrates the calculation result of the time differential velocity VT by the autoregulation velocity calculating portion 22 when the vehicle 9 installed with the PND 1 drives on an actual road. In addition, for comparison with the above calculation result, the calculation result of the GPS velocity VG obtained by the GPS processing portion 21 at this time is illustrated in FIG. 20.

Figure 20:
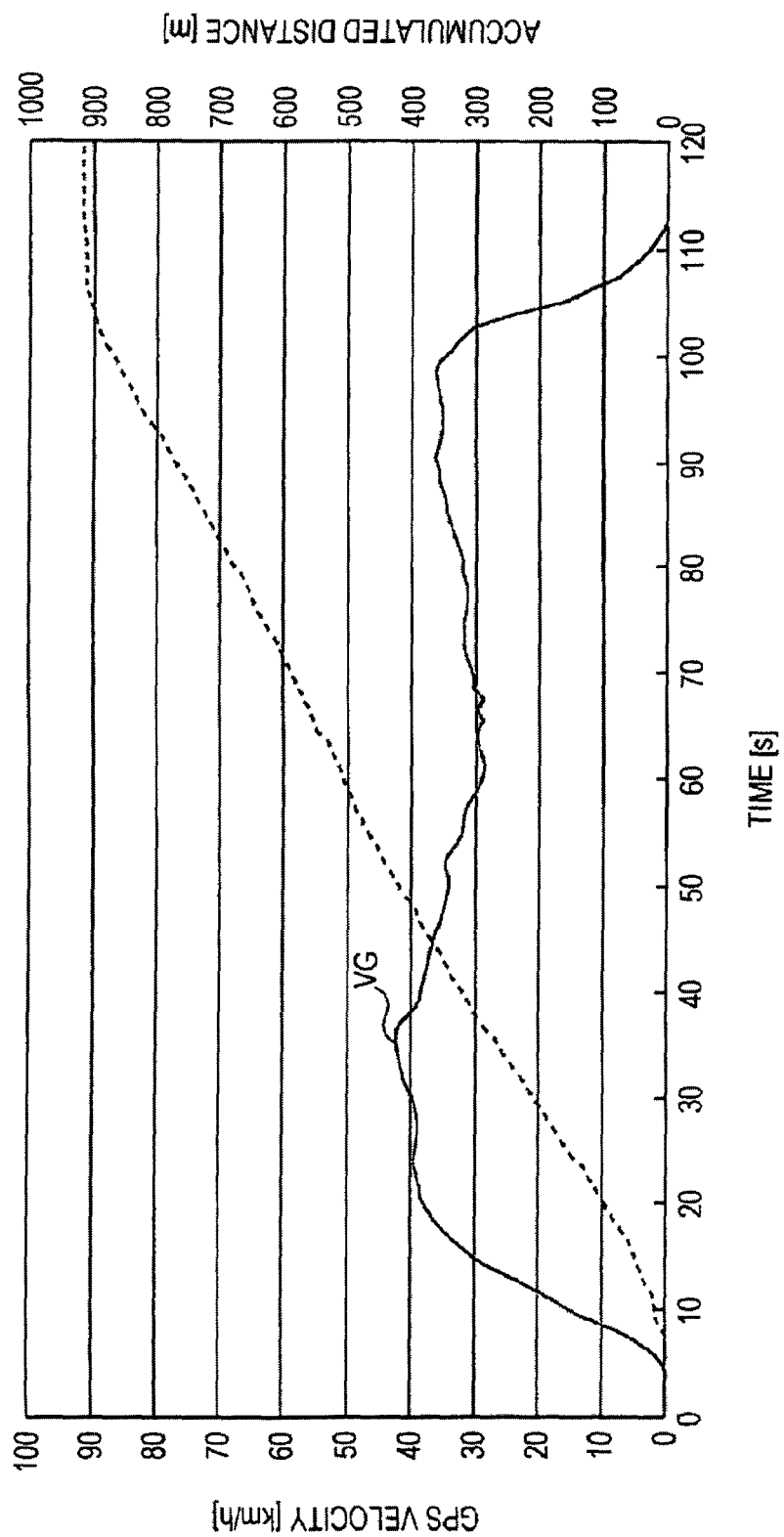
FIG. 20 is a schematic diagram illustrating a calculation result of a GPS velocity.

In addition, in FIGS. 19 and 20, the case where the vehicle 9 starts driving at the state of velocity of 0 and stops after about 110 seconds is illustrated. In addition, for the reference, an accumulated distance is indicated by a broken line.

By comparing FIG. 19 with FIG. 20, it is understood that, although some degrees of error are included, the time differential velocity VT is a value close to the GPS velocity VG, namely, that the time differential velocity VT represents the velocity of the vehicle 9 with good accuracy.

In this manner, it is recognized that the PND 1 may calculate the velocity of the vehicle 9 with good accuracy by using the time differential velocity VT obtained based on the acceleration $\alpha_z$ and the pitch rate $\omega_y$.

1-7. Operations and Effects

In the aforementioned configuration, the PND 1 allows the three-axis acceleration sensor 4 to detect the acceleration $\alpha_z$ in the vertical direction occurring in the vehicle 9 and allows the Y axis gyro-sensor 5 to detect the pitch rate $\omega_y$ around the Y axis perpendicular to the moving direction occurring in the vehicle 9.

Next, the PND 1 calculates the time difference $\Delta T$ based on the acceleration $\alpha_z$ and the pitch rate $\omega_y$, and, after that, calculates the time differential velocity VT by using the time difference $\Delta T$ and the installation distance D according to Equation (1).

Therefore, due to the simple configuration using only the three-axis acceleration sensor 4 and the Y axis gyro-sensor 5 as sensors, even in the case where the GPS signal may not be received, PND 1 may calculate the velocity of the vehicle 9 at high accuracy. In addition, since the PND 1 may calculate the current position of the vehicle 9 at high accuracy, so that it is possible to display a map screen having an appropriate range on the display portion 2 and to guide a correct path.

In other words, when the vehicle 9 moves in the vertical direction and the slope is changed due to the unevenness or the like of the road surface, the PND 1 may easily calculate the time differential velocity VT as the velocity of the vehicle 9 by using the occurrence of the time difference between the acceleration $\alpha_z$ of the vertical direction and the pitch rate $\omega_y$ around the Y axis.

In other words, the PND 1 may calculate the time differential velocity VT based on the time difference $\Delta T$ and the installation distance D by using the feature that the timings of the occurrence of the accelerations $\alpha_z$ in the vertical direction at the installation positions in the vehicle 9 are different from each other and the pitch rate $\omega_y$ occurs as a single value in the entire vehicle 9 and is estimated to be exerted to the central point of the wheel axis.

As a result, the PND 1 may not necessarily obtain a vehicle-velocity pulse signal, which is necessary for a general stationary type navigation apparatus, from the vehicle 9, and only if the PND 1 is fixed to the vehicle 9, the PND 1 may obtain the current position by calculating the time differential velocity VT. Therefore since the PND 1 may be configured by fixing the cradle 10 to the vehicle 9 through a very easy installation task using a sucker 10A (FIG. 1) and mounting the PND 1 on the cradle 10, it is possible to greatly improve user's convenience of usage.

In addition, the controller 12 of the PND 1 allows the time difference calculating portion 34 of the autoregulation velocity calculating portion 22 to securely obtain the time difference $\Delta T$ corresponding to the highest correlation between the acceleration $\alpha_z$ and the pitch rate $\omega_y$ by calculating the intercorrelation $\rho_{\alpha, \omega}$ between the acceleration $\alpha_z$ and the pitch rate $\omega_y$ according to Equations (2) to (5). Therefore, the PND 1 may obtain the time difference $\Delta T$ between the characteristic components of the acceleration $\alpha_z$ and the pitch rate $\omega_y$ at high accuracy.

In other points of view, the PND 1 may calculate the time differential velocity VT by using the time difference $\Delta T$ between the times when changes of signal waveforms occur without restriction to the errors with respect to the signal levels of the detection signals generated by the three-axis acceleration sensor 4 and the Y axis gyro-sensor 5.

For this reasons, even in the case where the accuracy of the detection signal is low or in the case where noise or the like is included in the detection signal, if the time points of the occurrence of the characteristic components in the waveforms may be perceived, the PND 1 may calculate the time difference $\Delta T$ and the time differential velocity VT at high accuracy by the three-axis acceleration sensor 4 and the Y axis gyro-sensor 5.

In addition, the controller 12 of the PND 1 treats the value of the intercorrelation $\rho_{\alpha,\omega}$ between the acceleration $\alpha_z$ and the pitch rate $\omega_y$ as a quadratic function of the shift amount H as expressed in Equation (6) and calculate the shift amount H with an accuracy higher than the sampling period by using Equation (8), so that the shift amount H may be set as the time difference $\Delta T$.

In addition, when the GPS velocity VG may be acquired, the controller 12 of the PND 1 may calculate the installation distance D by performing the calculation of Equation (9) by using the time difference $\Delta T$. Therefore, the PND 1 may obtain the installation distance D easily with good accuracy, which a general user may not be able to easily measure, so that it is possible to reduce time and effort of the user and to improve the accuracy of calculation of the time differential velocity VT.

In addition, the controller 12 of the PND 1 may perceive the moving direction of the vehicle 9 with good accuracy by determining which one of the acceleration $\alpha_z$ and the pitch rate $\omega_y$ precedes.

According to the aforementioned configuration, the controller 12 of the PND 1 allows the autoregulation velocity calculating portion 22 to calculate the time difference $\Delta T$ corresponding to the highest correlation between the acceleration $\alpha_z$ and the pitch rate $\omega_y$ by using the intercorrelation $\rho_{\alpha,\omega}$ between the acceleration $\alpha_z$ and the pitch rate $\omega_y$ and to calculate the time differential velocity VT by dividing the installation distance D with the time difference $\Delta T$. As a result, even in the case where the GPS signal may not be received, the PND 1 may use the time differential velocity VT as the velocity of the vehicle 9. In addition, the PND 1 may calculate the current position of the vehicle 9 at high accuracy based on the time differential velocity VT, so that it is possible to display a map screen having an appropriate range on the display portion 2 and to guide a correct path.

2. Second Embodiment 2-1. Configurations of PND and Autoregulation Velocity Calculating Portion A PND 50, according to a second embodiment of a navigation unit 51, has the same configuration as that of the PND 1 according to the first embodiment except for a controller 52 as a substitute for the controller 12.

Figure 21:
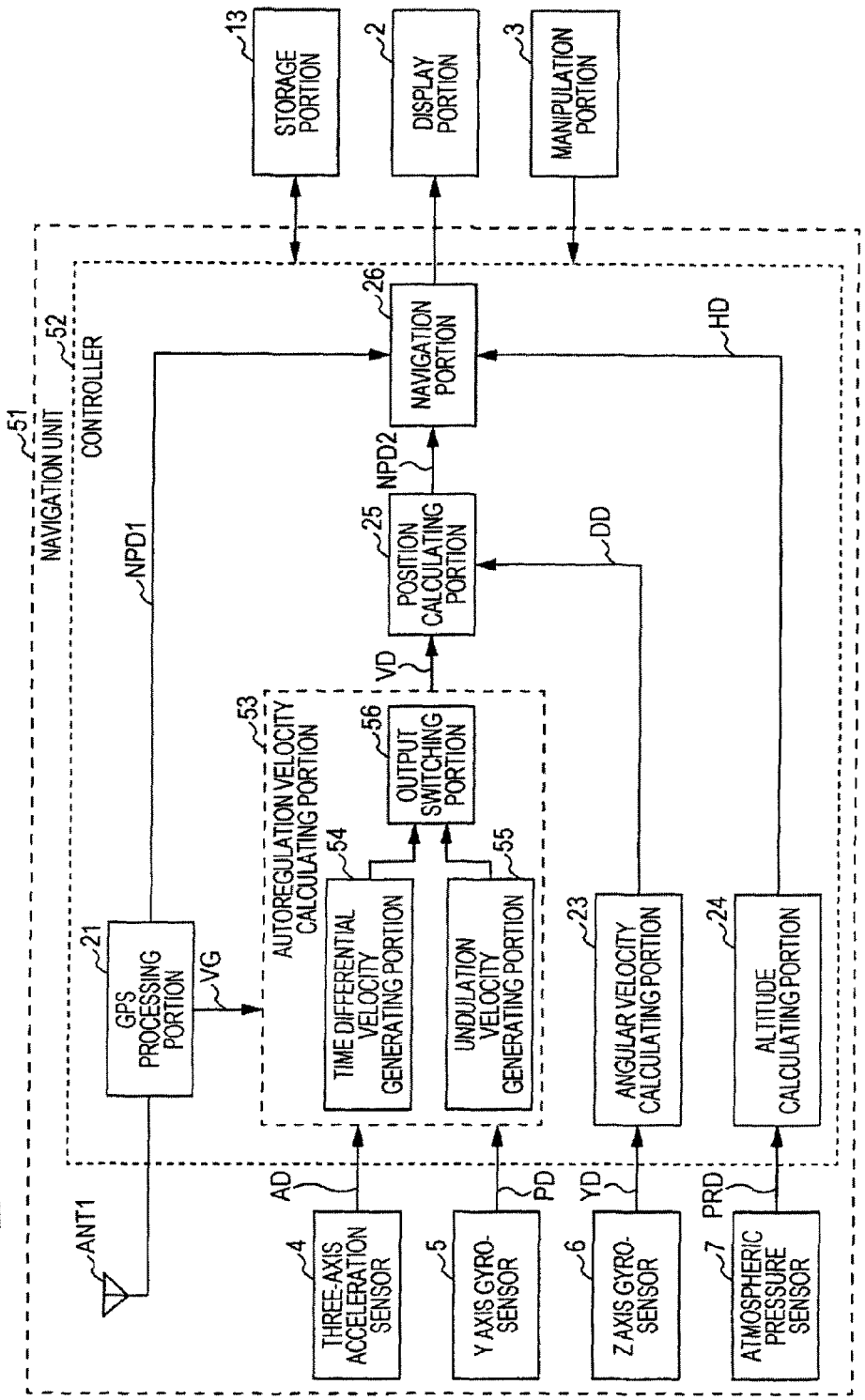
FIG. 21 is a schematic diagram illustrating a circuit configuration of a PND according to a second embodiment.

As illustrated in FIG. 21 where the same components as those of FIG. 12 are denoted by the same reference numerals, the controller 52 has the same configuration as that of the controller 12 except that an autoregulation velocity calculating portion 53 as a substitute for the autoregulation velocity calculating portion 22 is provided and an atmospheric pressure sensor 7 and an altitude calculating portion 24 are provided.

The atmospheric pressure sensor 7 detects an ambient atmospheric pressure PR in a sampling frequency of, for example, 50 [Hz] and transmits atmospheric pressure data PRD representing the atmospheric pressure PR to the altitude calculating portion 24.

The altitude calculating portion 24 calculates the altitude of the vehicle 9 based on the atmospheric pressure PR corresponding to the atmospheric pressure data PRD supplied from the atmospheric pressure sensor 7 and transmits the altitude data HD representing the altitude to the navigation portion 26.

The navigation portion 26 reads vicinity map data including the current position of the vehicle 9 from the storage portion 13 based on the current position data NPD1 supplied from the GPS processing portion 21, the current position data NPD2 supplied from the position calculating portion 25, and the altitude data HD supplied from the altitude calculating portion 24.

In addition, the navigation portion 26 is configured to generate a map image including the current position and, after that, to output the map image to the display portion 2 to display the map image.

The autoregulation velocity calculating portion 53 is configured to include a time differential velocity generating portion 54 which calculates a time differential velocity VT, an undulation velocity generating portion 55 which calculates a velocity (hereinafter, referred to as an undulation velocity VU) of the vehicle 9 by using undulation of a road surface, and an output switching portion 56 which switches the time differential velocity VT of the undulation velocity VU to output as autoregulation velocity data VD.

2-2. Configuration of Time Differential Velocity Calculating Portion

As illustrated in FIG. 22 where the same components as those of FIG. 13 are denoted by the same reference numerals, the time differential velocity generating portion 54 has the same configuration as that of the autoregulation velocity calculating portion 22 according to the first embodiment except that a time difference calculating portion 61 and a velocity output portion 62 as substitutes for the time difference calculating portion 34 and the velocity output portion 37 are provided.

Unlike the first embodiment using the intercorrelation $\rho_{\alpha,\omega}$ the time difference calculating portion 61 is configured to calculate the time difference $\Delta T$ by using the maximum values or the minimum values of the acceleration $\alpha_z$ and the pitch rate $\omega_y$.

In other words, the time difference calculating portion 61 reads the acceleration $\alpha_z$ obtained within the past calculation period CP (for example, within past 1 [s]) from the current time point among the accelerations $\alpha_z$ stored in the storage portion 13 to acquire a maximum acceleration $\alpha_z$ max which is the maximum value of the acceleration $\alpha_z$ and to recognize the time point $T\alpha_{z\ max}$ at which the maximum acceleration $\alpha_{z\ max}$ is acquired.

In addition, the time difference calculating portion 61 reads the pitch rate $\omega_y$ obtained within the past calculation period CP from the current time point among the pitch rates $\omega_y$ stored in the storage portion 13 to acquire a maximum pitch rate $\omega_{y\ max}$ which is the maximum value of the pitch rate $\omega_y$ and to recognize the time point $T\omega_{y\ max}$ at which the maximum pitch rate $\omega_{y\ max}$ is acquired.

In addition, in the case where the maximum acceleration $\alpha_{z\ max}$ which is the maximum value of the acceleration $\alpha_z$ obtained within the calculation period CP may not be acquired, the time difference calculating portion 61 acquires the minimum acceleration $\alpha_{z\_min}$ which is the minimum value of the acceleration $\alpha_z$ instead of the maximum acceleration $\alpha_{z\_max}$ and recognizes the time point $T\alpha_{z\_min}$ at which the minimum acceleration $\alpha_{z\_min}$ is acquired. In this case, the time difference calculating portion 61 also acquires the minimum pitch rate $\omega_{y\_min}$ of the pitch rate $\omega_y$ and recognizes the time point $T\omega_{y\_min}$ at which the minimum pitch rate $\omega_{y\_min}$ is acquired.

Next, the time difference calculating portion 61 sets the difference between the time point $T\alpha_{z\_max}$ and the time point $T\omega_{y\_max}$ or the difference between the time point $T\alpha_{z\_min}$ and the time point $T\omega_{y\_min}$ as the time difference $\Delta T$ and supplies the time difference $\Delta T$ to the time differential velocity calculating portion 35 and the installation distance setting portion 38.

In addition, if the time differential velocity VT represented by the time differential velocity data VTD is lower than 3 [km/h], the time differential velocity output portion 62 corrects the time differential velocity VT as the value of 0 and, after that, outputs the time differential velocity data VTD to the output switching portion 56.

However, with respect to the acceleration $\alpha_z$ and the pitch rate $\omega_y$, the case where a plurality of the maximum values or the minimum values are included in the calculation period CP is considered.

Therefore, the time differential velocity calculating portion 54 is configured to store the immediately previous time differential velocity VT in the storage portion 13 and to calculate a time differential velocity VT by using the maximum value or the minimum value at which the newly calculated time differential velocity VT is closest to the immediately previous time differential velocity VT.

In this manner, the time differential velocity generating portion 54 is configured to calculate the time difference $\Delta T$ by using the maximum values or the minimum values of the acceleration $\alpha_z$ and the pitch rate $\omega_y$ and to calculate the time differential velocity VT.

2-3. Configuration of Undulation Velocity Calculating Portion

Now, calculation of the undulation velocity VU by the undulation velocity generating portion 55 is described.

2-3-1. Undulation Velocity Calculation Principle

First, a calculation principle of the undulation velocity VU is described. In actual cases, the vehicle 9 driving on the road as the movement plane may not drive on a flat road, but it may drive on an overall concave road as illustrated in FIG. 23A or on an overall convex road as illustrated in FIG. 23B.

For example, when the vehicle 9 drives on a concave road (FIG. 23A), the PND 50 which is mounted on, for example, the dashboard (that is, the installation position N1) of the vehicle 9 allows the three-axis acceleration sensor 4 (FIG. 21) to detect the acceleration $\alpha_z$ in the downward direction along the Z axis in a sampling frequency of, for example, 50 [Hz].

In addition, the PND 50 allows the Y axis gyro-sensor 5 (FIG. 21) to detect the angular velocity around the Y axis, that is, the pitch rate $\omega_y$ in a sampling frequency of 50 [Hz].

Figure 23A:
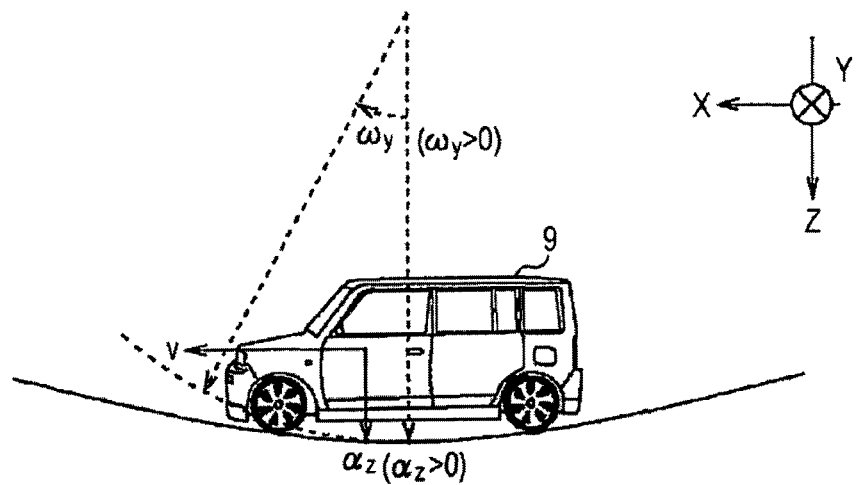
FIGS. 23A and 23B are schematic diagrams illustrating a behavior at the time of driving on uneven road surface.
Figure 23B:
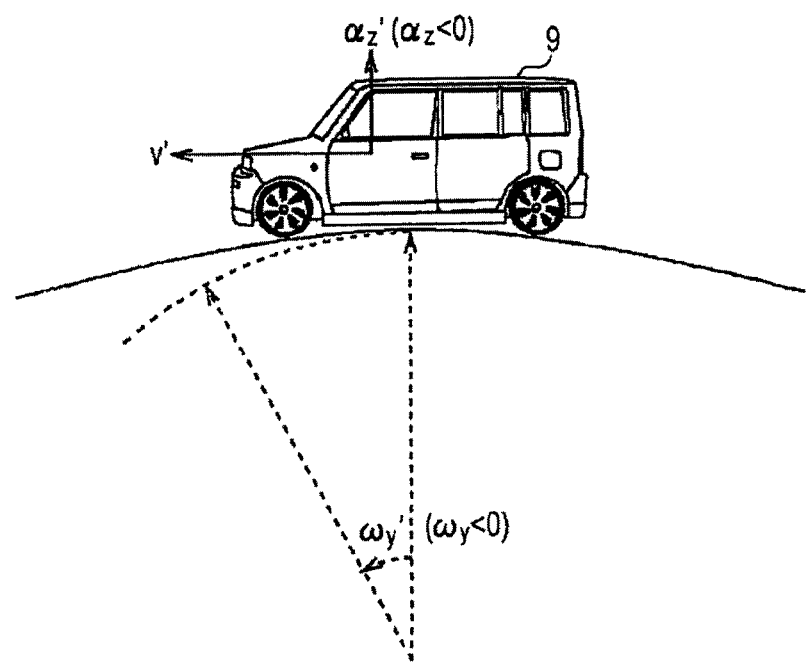

In addition, herein, the acceleration $\alpha_z$ in the downward direction along the Z axis is defined to be positive, and the pitch rate $\omega_y$ of the time when the vehicle 9 vertically rotates in the upward direction with respect to the moving direction along an imaginary circle formed along the concave road surface as illustrated in FIG. 23A is defined to be positive.

Sequentially, the PND 50 calculates the velocity V in the moving direction at a rate of 50 times per second by using the acceleration $\alpha_z$ and the pitch rate $\omega_y$ according to the following Equation (10).

[Equation 10]

$$V = \frac{\alpha_z}{\omega_y} \qquad (10)$$

In addition, when the vehicle 9 drives on the convex-shaped road (FIG. 23B), the PND 50 detects the acceleration $\alpha_z'$ in the upward direction along the Z axis by the three-axis acceleration sensor 4 in a sampling frequency of, for example, 50 [Hz] and detects the pitch rate $\omega_y'$ around the Y axis by the Y axis gyro-sensor 5 in a sampling frequency of, for example, 50 [Hz].

Next, the PND 50 calculates the velocity V' in the moving direction at a rate of 50 times per second by using the acceleration $\alpha_z'$ and the pitch rate $\omega_y'$ according to the following Equation (11).

[Equation 11]

$$V' = \frac{\alpha_z'}{\omega_y'} \qquad (11)$$

Herein, for the convenience of description, a negative acceleration $\alpha_z$ is described as the acceleration $\alpha_z'$. However, in the actual case, the three-axis acceleration sensor detects the acceleration $\alpha_z'$ as the negative value of the acceleration $\alpha_z$. In addition, similarly, with respect to the pitch rate $\omega_y'$, a negative pitch rate $\omega_y$ is described as the pitch rate $\omega_y'$. However, in the actual case, the Y axis gyro-sensor detects the pitch rate $\omega_y'$ as the negative value of the pitch rate $\omega_y$. Therefore, in an actual case, the velocity V' is also calculated as the velocity V.

In this manner, the PND 50 is configured to calculate a velocity V, that is, an undulation velocity VU from Equation (10) by using the acceleration $\alpha_z$ and the pitch rate $\omega_y$.

2-3-2. Undulation Velocity Calculating Process

As illustrated in FIG. 22, when the velocity calculating portion 53 performs the undulation velocity calculating process, the velocity calculating portion 53 functions as an LPF/HPF processing portion 63, an undulation velocity calculating portion 65, a smoothing and noise removing portion 66, and an undulation velocity output portion 67.

The LPF/HPF processing portion 63 removes DC components and high-frequency band components of the acceleration data AD1 and the pitch rate data PD1 and supplies obtained acceleration data AD3 and pitch rate data PD3 to the undulation velocity calculating portion 65.

In addition, the frequency range necessary for the acceleration data AD3 and the pitch rate data PD3 in the undulation velocity calculating portion 65 of the undulation velocity generating portion 55 is different from the frequency range necessary for the acceleration data AD2 and the pitch rate data PD2 in the time difference calculating portion 61 of the time differential velocity generating portion 54.

Therefore, in the LPF/HPF processing portion 63, the DC components and the high-frequency band components of the acceleration data AD1 and the pitch rate data PD1 are removed by a cutoff frequency which is different from that of the LPF/HPF processing portion 33 of the time differential velocity generating portion 54.

However, as illustrated in FIGS. 4 to 6, in the acceleration $\alpha_z$ and the pitch rate $\omega_y$, a time difference (that is, a phase difference) occurs when corresponding characteristic components appear.

Therefore, the undulation velocity calculating portion 65 is configured so as to remove the influence of the phase difference by using a difference between the maximum value and the minimum value with respect to the acceleration $\alpha_z$ and the pitch rate $\omega_y$.

More specifically, the undulation velocity calculating portion 65 extracts the maximum value and the minimum value of the acceleration $\alpha_z$ corresponding to the acceleration data AD3 in a predetermined calculation period as the maximum acceleration $\alpha_{z,max}$ and the minimum acceleration $\alpha_{z,min}$.

In addition, the undulation velocity calculating portion 65 extracts the maximum value and the minimum value of the pitch rate $\omega_y$ corresponding to the pitch rate data PD3 in a predetermined calculation period as the maximum pitch rate $\omega_{y,max}$ and the minimum pitch rate $\omega_{y,min}$.

Sequentially, the undulation velocity calculating portion 65 calculates an undulation velocity VU by performing calculation according to the following Equation 12 and transmits undulation velocity data VUD0 representing the undulation velocity VU to the smoothing and noise removing portion 66.

[Equation 12]

$$V = \frac{\alpha_{z,max} - \alpha_{z,min}}{\omega_{y,max} - \omega_{y,min}} \quad (12)$$

The smoothing and noise removing portion 66 performs a predetermined smoothing and noise removing process on the undulation velocity data VUD0 to reduce an error included in the undulation velocity VU and transmits the obtained undulation velocity data VUD to the undulation velocity output portion 67.

The undulation velocity output portion 67 transmits the undulation velocity data VUD supplied from the smoothing and noise removing portion 66 to the output switching portion 56.

In this manner, the velocity calculating portion 22 is configured to calculate the undulation velocity VU of the vehicle 9 based on the acceleration data AD supplied from the three-axis acceleration sensor 4 and the pitch rate data PD supplied from the Y axis gyro-sensor 5.

2-4. Switching to Velocity

However, although the undulation velocity VU may be calculated with high accuracy in terms of the calculation principle in the case where the velocity of the vehicle 9 is relatively high, the accuracy is lowered and the error is increased in the case where the velocity of the vehicle 9 is relatively small.

On the other hand, as expressed in Equation (1), the time differential velocity VT is calculated by dividing the installation distance D by the time difference $\Delta T$. Herein, in the case where the installation distance D is 1 [m] or 0.5 [m], the calculation results of the time differential velocity VT corresponding to the time difference $\Delta T$ of 0.02 to 0.20 [s] are illustrated in FIGS. 24A and 24B.

In addition, the reason that the time difference $\Delta T$ becomes a discrete value in units of 0.02 [s] is as follows. Namely, as described above, the sampling periods of the acceleration $\alpha_z$ and the pitch rate $\omega_y$ are 0.02 [s], and thus, the calculation result of the time difference $\Delta T$ becomes a discrete value divided by 0.02 [s].

In addition, in FIGS. 24A and 24B, the number of steps representing the time difference $\Delta T$ is additionally illustrated as the unit of the sampling period (0.02 [s]).

For example, in the case where the installation distance D is 1 [m] (FIG. 24A), when the time difference $\Delta T$ is relatively small, for example, in a range of from 0.02 [s] to 0.08 [s], the interval between the calculated time differential velocities VT is relatively increased. This denotes that the accuracy of the calculated time differential velocity VT is low and the error included in the time differential velocity VT is large.

In addition, when the time difference $\Delta T$ is relatively large, for example, in a range of from 0.10 [s] to 0.20 [s], the interval between the calculated time differential velocities VT becomes relatively small. This denotes that the accuracy of the calculated time differential velocity VT is high and the error included in the time differential velocity VT is small.

In other words, contrary to the undulation velocity VU, although the time differential velocity VT may be calculated with high accuracy in the case where the velocity of the vehicle 9 is relatively low, the accuracy is lowered and the error is increased in the case where the velocity of the vehicle 9 is relatively high.

Therefore, the output switching portion 56 (FIG. 21) of the autoregulation velocity calculating portion 53 is configured to switchably select the time differential velocity VT in the case where the velocity of the vehicle 9 is relatively low and to switchably select the undulation velocity VU in the case where the velocity of the vehicle 9 is relatively high.

More specifically, the threshold value TH is defined so that the error of the time differential velocity VT calculated in the case where the vehicle 9 drives at a constant speed is equal to or less than 10%. The output switching portion 56 is configured to switchably select the undulation velocity VU in the case where the time differential velocity VT is larger than the threshold value TH.

Herein, the case where the error of the time differential velocity VT is larger than 10% is described. For example, in the case where the installation distance D=1 [m], if the velocity of the vehicle 9 is 40 [km/h], the time differential velocity VT is any one of 36 [km/h] or 45 [km/h]. Therefore, the error is likely to be larger than 10%.

On the other hand, for example, if the velocity of the vehicle 9 is 33 [km/h], the time differential velocity VT is any one of 30 [km/h] and 36 [km/h], and the error is most likely to be 10% or less.

Therefore, in the case where the installation distance D=1 [m], the output switching portion 56 defines the threshold value TH as 36 [km/h].

In addition, even in the case where the installation distances D have various values, the output switching portion 56 defines each of the threshold values TH. In this case, the threshold value TH becomes the maximum value where the ranges of error of 10% of the adjacent values are overlapped among the time differential velocities VT having a discrete value.

For example, in the case where the installation distance D is 0.5 [m] (FIG. 24B), when the time difference $\Delta T$ is 0.12 [s], the time differential velocity VT is 15 [km/h], and if the error of 10% is added, the time differential velocity VT is 16.5 [km/h]. In addition, when the time difference $\Delta T$ is 0.10 [s], the time differential velocity VT is 18 [km/h], and if the error of 10% is added, the time differential velocity VT is 16.2

[km/h]. In other words, in a range of the time difference ΔT between 0.12 and 0.10 [s], the range of the error of 10% is overlapped.

On the other hand, in FIG. 24B, when the time difference ΔT is 0.10 [s], the time differential velocity VT is 18 [km/h], and if the error of 10% is added, the time differential velocity VT is 19.8 [km/h]. In addition, when the time difference ΔT is 0.08 [s], the time differential velocity VT is 22.5 [km/h], and if the error of 10% is subtracted, the time differential velocity VT is 20.25 [km/h]. In other words, in a range of the time difference ΔT between 0.10 and 0.08 [s], the range of the error of 10% is not overlapped.

Therefore, the output switching portion 56 sets the threshold value TH of the case where the installation distance D is 0.5 [m] to 18 [km/h] which is the maximum value in which the range of 10% error is overlapped.

In addition, the output switching portion 56 stores the threshold values TH in correspondence with the installation distances D in the storage portion 13 in advance.

Therefore, in the case where the time differential velocity VT is equal to or less than the threshold value TH, the output switching portion 56 outputs the time differential velocity VT as the autoregulation velocity data DT. In addition, in the case where the time differential velocity VT is equal to or less than the threshold value TH, the output switching portion 56 switchably selects the time differential velocity VT as the undulation velocity VU, namely, outputs the undulation velocity VU as the autoregulation velocity data DT.

2-5. Operations and Effects

In the aforementioned configuration, the PND 50 according to the second embodiment detects the acceleration $\alpha_z$ in the vertical direction occurring in the vehicle 9 by the three-axis acceleration sensor 4 and detects the pitch rate $\omega_y$ around the Y axis perpendicular to the moving direction occurring in the vehicle 9 by the Y axis gyro-sensor 5.

In addition, similarly to the first embodiment, the PND 50 calculates the time difference ΔT based on the acceleration $\alpha_z$ and the pitch rate $\omega_y$ and, after that, calculates the time differential velocity VT by using the time difference ΔT and the installation distance D according to Equation (1).

Therefore, due to the simple configuration using only the three-axis acceleration sensor 4 and the Y axis gyro-sensor 5 as sensors, even in the case where the GPS signal may not be received, the PND 50 may calculate the velocity of the vehicle 9 at high accuracy. In addition, since the PND 50 may calculate the current position of the vehicle 9 at high accuracy, so that it is possible to display a map screen having an appropriate range on the display portion 2 and to guide a correct path.

In other words, when the vehicle 9 moves in the vertical direction and the slope is changed due to the unevenness or the like of the road surface, the PND 50 may easily calculate the time differential velocity VT as the velocity of the vehicle 9 by using the occurrence of the time difference between the acceleration $\alpha_z$ of the vertical direction and the pitch rate $\omega_y$ around the Y axis.

In addition, the controller 52 of the PND 50 allows the time differential velocity calculating portion 54 of the autoregulation velocity calculating portion 53 to calculate the time difference ΔT by using the maximum values or the minimum values of the acceleration $\alpha_z$ and the pitch rate $\omega_y$. Therefore, in comparison with the first embodiment using the intercorrelation $\rho_{\alpha,\omega}$, the controller 52 may greatly reduce the process load necessary for the calculation.

In addition, the controller 52 of the PND 50 allows the output switching portion 56 of the autoregulation velocity calculating portion 53 to switchably select any one of the time differential velocity VT and the undulation velocity VU, which are calculated by the two types of the calculating methods, as the autoregulation velocity data DT.

In particular, based on the feature that the accuracy of the time differential velocity VT is improved as the velocity is relatively low and, on the contrary, the accuracy of the undulation velocity VU is improved as the velocity is relatively high, the output switching portion 56 sets the time differential velocity VT as the autoregulation velocity data DT in the case where the time differential velocity VT is equal to or less than the threshold value TH, and the output switching portion 56 sets undulation velocity VU as the autoregulation velocity data DT in other cases. Therefore, in comparison with the first embodiment using only the time differential velocity VT, the output switching portion 56 may greatly improve the accuracy of the autoregulation velocity data DT.

In addition, with respect to other points, the PND 50 may show the same functions and effects as those of the PND 1 according to the first embodiment.

According to the aforementioned configuration, the controller 52 of the PND 50 allows the time differential velocity calculating portion 54 to calculate the time difference ΔT by using the maximum values and minimum values of the acceleration $\alpha_z$ and the pitch rate $\omega_y$ and to calculate the time differential velocity VT by dividing installation distance D with the time difference ΔT. In addition, the controller 52 allows the undulation velocity calculating portion 55 to calculate the undulation velocity VU by dividing the acceleration $\alpha$ with the angular velocity $\omega$. In addition, the controller 52 allows the output switching portion 56 to select the time differential velocity VT as the autoregulation velocity data DT if the time differential velocity VT is equal to or less than the threshold value TH and to select the undulation velocity VU as the autoregulation velocity data DT if not. As a result, even in the case where a GPS signal may not be received, the PND 50 may use the time differential velocity VT or the undulation velocity VU as the autoregulation velocity of the vehicle 9. In addition, the PND 50 may calculate the current position of the vehicle 9 with high accuracy based on the autoregulation velocity, so that it is possible to display a map screen having an appropriate range on the display portion 2 and to guide a correct path.

3. Third Embodiment

Figure 25:
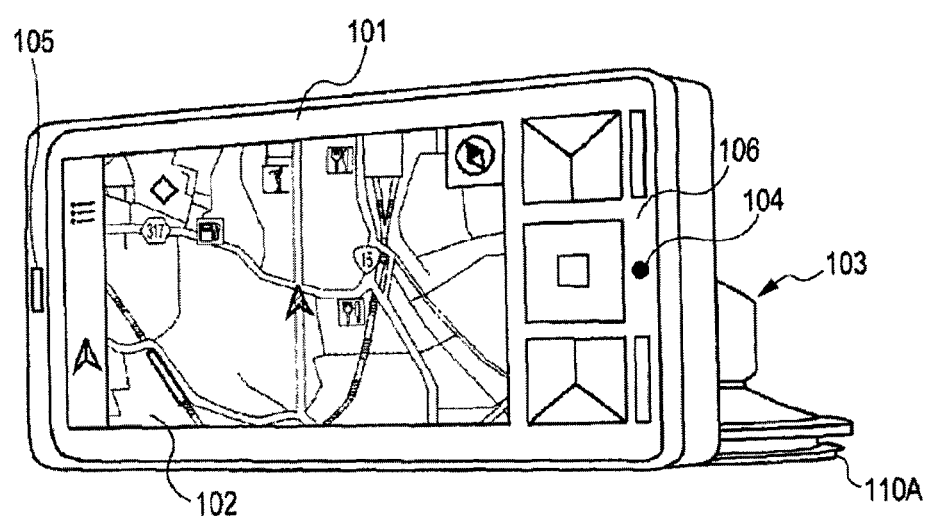
FIG. 25 is a schematic diagram illustrating the entire configuration of a mobile phone.

As illustrated in FIG. 25, a mobile phone 101 according to a third embodiment includes a display portion 102 which is constructed with an LCD (liquid crystal device) to perform various types of display, a microphone 104, a speaker 105, and a manipulation portion 106 which is constructed with input buttons or the like.

In addition, similarly to the PND 1 according to the first embodiment, the mobile phone 101 is configured to be mounted on the vehicle 9 (FIG. 2) through a cradle 103.

Figure 26:
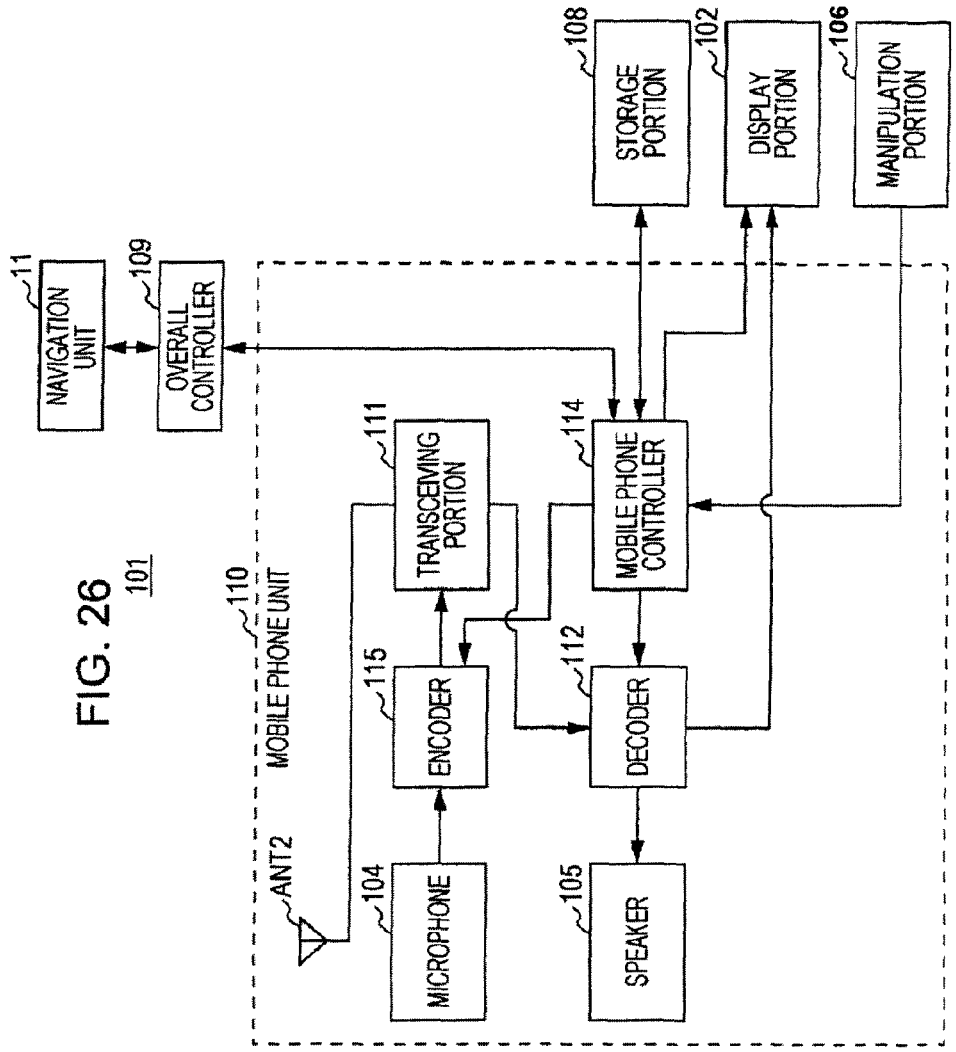
FIG. 26 is a schematic diagram illustrating a circuit configuration of a mobile phone.

As illustrated in FIG. 26, in the mobile phone 101, an overall controller 109 which is constructed with a CPU is configured to control a mobile phone unit 110 functioning as a mobile phone and a navigation unit 11 performing the same navigation process as that of the aforementioned first embodiment.

The mobile phone unit 110 is connected to a display portion 102, a manipulation portion 106, and a storage portion 108 configured with a semiconductor memory or the like and used to store various data. In addition, although simply illustrated in FIG. 26, the display portion 102, the manipulation portion 106, and the storage portion 108 are connected to the navigation unit 11.

In the case of performing a call function, the mobile phone 101 uses the mobile phone unit 110 in order to implement the call function or the e-mail function. In the actual case, the mobile phone unit 110 of the mobile phone 101 transmits a receiving signal, which is received from a base station (not shown) through the antenna ANT2, to the transceiving portion 111.

The transceiving portion 111 is configured with a transmitting portion and a receiving portion to convert a receiving signal to receiving data by demodulating the receiving signal in a predetermined manner and to transmit the receiving data to the decoder 112. The decoder 112 recovers call voice data of a counterparty by decoding the receiving data according to the control of the mobile phone controller 114, configured with a microcomputer, and outputs the call voice data to the speaker 105. The speaker 105 outputs a call voice of the counterparty based on the call voice data.

On the other hand, the mobile phone unit 110 transmits voice signals collected by the microphone 104 to an encoder 115. Under the control of the mobile phone controller 114, the encoder 115 converts the voice signals into digital signals and, after that, transmits the voice data obtained by encoding in a predetermined method to the transceiving portion 111.

The transceiving portion 111 modulates the voice data according to a predetermined method and transmits the voice data to a base station (not shown) through the antenna ANT2 in a wireless manner.

At this time, the mobile phone controller 114 of the mobile phone unit 110 displays the counterparty's phone number, electromagnetic wave reception situation, or the like on display 102 in response to a manipulation command from the manipulation portion 106.

In addition, in the case where the mobile phone controller 114 of the mobile phone unit 110 receives an e-mail through a communication function, received data are supplied from the transceiving portion 111 to the decoder 112, e-mail data recovered by decoding the received data are transmitted to the display portion 102, and contents of the e-mail are displayed on the display portion 102 and stored in the storage portion 108.

In addition, in the case where the mobile phone controller 114 of the mobile phone unit 110 transmits an e-mail through the communication function, e-mail data input through the manipulation portion 106 is encoded by an encoder 115, and after that, the e-mail data are transmitted in a wireless manner through the transceiving portion 111 and the antenna ANT2.

On the other hand, in the case where the mobile phone 101 performs the navigation function, the overall controller 109 controls the navigation unit 11 to perform the navigation process.

Similarly to the first embodiment, the navigation unit 11 generates a vicinity map image including the current position of the vehicle 9 based on the current position data NPD1 obtained based on the GPS signals or the current position data NPD2 obtained based on the acceleration $\alpha_z$ and the pitch rate $\omega_y$ and displays the map image on the display portion 102.

At this time, similarly to the first embodiment, the autoregulation velocity calculating portion 22 (FIGS. 12 and 13) is configured to calculate time difference $\Delta T$ by using the correlation between the acceleration $\alpha_z$ and the pitch rate $\omega_y$ and to calculate the time differential velocity VT according to Equation (1).

Therefore, similarly to the first embodiment, due to the simple configuration using only the three-axis acceleration sensor 4 and the Y axis gyro-sensor 5 as sensors, even in the case where the GPS signal may not be received, the mobile phone 101 according to the third embodiment may calculate the velocity of the vehicle 9 at high accuracy by using the navigation unit 11.

In addition, the mobile phone 101 may calculate the current position of the vehicle 9 at high accuracy, so that it is possible to display a map screen having an appropriate range on the display portion 102 and to guide a correct path.

In other words, when the vehicle 9 moves in the vertical direction and the slope is changed due to the unevenness or the like of the road surface, the mobile phone 101 may easily calculate the time differential velocity VT as the velocity of the vehicle 9 by using the occurrence of the time difference between the acceleration $\alpha_z$ of the vertical direction and the pitch rate $\omega_y$ around the Y axis.

In addition, with respect to other points, the mobile phone 101 may show the same functions and effects as those of the PND 1 according to the first embodiment.

According to the aforementioned configuration, in the mobile phone 101 according to the third embodiment, the controller 12 of the navigation unit 11 allows the autoregulation velocity calculating portion 22 to calculate the time difference $\Delta T$ corresponding to the highest correlation between the acceleration $\alpha_z$ and the pitch rate $\omega_y$ by using the intercorrelation $\rho_{\alpha, \omega}$ between the acceleration $\alpha_z$ and the pitch rate $\omega_y$, and to calculate the time differential velocity VT by dividing the installation distance D with the time difference $\Delta T$. As a result, even in the case where the GPS signal may not be received, the mobile phone 101 may use the time differential velocity VT as the velocity of the vehicle 9. In addition, the mobile phone 101 may calculate the current position of the vehicle 9 at high accuracy based on the time differential velocity VT, so that it is possible to display a map screen having an appropriate range on the display portion 102 and to guide a correct path.

4. Other Embodiments

In addition, in the aforementioned first embodiment, the case of allowing the time difference calculating portion 34 of the autoregulation velocity calculating portion 22 to calculate the time difference $\Delta T$ based on the intercorrelation $\rho_{\alpha, \omega}$ is described.

The invention is not limited thereto. For example, the time difference $\Delta T$ may be calculated by directly using the covariance $cov(\alpha_z, \omega_z)$ calculated according to Equation (5). In this manner, the time difference $\Delta T$ corresponding to the highest correlation may be obtained by using various indexes representing the strength of the correlation between the acceleration $\alpha_z$ and the pitch rate $\omega_y$.

In addition, in the aforementioned second embodiment, the case of calculating the time difference $\Delta T$ by using the maximum values or the minimum values of the acceleration $\alpha_z$ and the pitch rate $\omega_y$ is described.

The invention is not limited thereto. For example, in the case where the polarities of the acceleration data AD3 and the pitch rate data PD3 representing the acceleration $\alpha_z$ and the pitch rate $\omega_y$ are opposite to each other, the time difference $\Delta T$ may be calculated by using the maximum value of one of the acceleration $\alpha_z$ and the pitch rate $\omega_y$ and the minimum value of the other thereof.

In addition, in the invention, various methods may be used instead of the method using various indexes representing the strength of the correlation or the method using the extreme values. The main point is that the time shift amount (that is, a time difference between the characteristic components) between the characteristic positions corresponding to the waveform of the acceleration $\alpha_z$ and the waveform of the pitch rate $\omega_y$ may be calculated as the time difference $\Delta T$.

In addition, in the aforementioned first embodiment, the case of treating the value of the intercorrelation $\rho_{\alpha, \omega}$ as a quadratic function of Equation (6) and calculating the shift amount H at a higher accuracy than the sampling interval by using Equation (8) is described.

The invention is not limited thereto. For example, although the sampling frequency is high and the sampling interval is a discrete value, in the case where the shift amount H (that is, the time difference ΔT) is obtained with a sufficient accuracy, the shift amount H of the time when the value of the intercorrelation $\rho_{\alpha, \omega}$ is maximized may be directly used as the time difference ΔT.

In addition, in the aforementioned second embodiments, when a plurality of maximum values or minimum values are detected by the time difference calculating portion 61, the case where the time differential velocity VT is calculated by using the maximum value or minimum value where the newly-calculated time differential velocity VT is closest to the immediately previous time differential velocity VT is described.

The invention is not limited thereto. For example, differences between a plurality of maximum values of the acceleration $\alpha_z$ and the pitch rate $\omega_y$ are calculated, and the difference which gives the smallest variation of the difference values is selected as the time difference ΔT. In this manner, the time difference ΔT may be calculated by using various methods.

In addition, in the aforementioned first embodiment, the case of determining the moving direction of the vehicle 9 from the acceleration $\alpha_z$ and the pitch rate $\omega_y$, and reflecting the moving direction to the autoregulation velocity V (time differential velocity VT) only in the case where the autoregulation velocity V is calculated without reception of the GPS signals is described.

The invention is not limited thereto. Besides the case of calculating the time differential velocity VT, for example, the moving direction of the vehicle 9 may be determined from the acceleration $\alpha_z$ and the pitch rate $\omega_y$, and the determination result may be supplied to the position calculating portion 25 or the navigation portion 26 to be used for a positioning process, a navigation process, or the like.

In addition, in the aforementioned first embodiment, the case where the angular velocity of the vehicle 9 is estimated to be exerted to the central point WM (FIG. 2) and the distance from the installation position of the PND 1 to the central point WM of the wheel axis is set to the installation distance D is described.

The invention is not limited thereto. But, the angular velocity may be estimated to be exerted to an arbitrary position such as the center of the vehicle 9, and the distance from the position to the installation position of the PND 1 may be set to the installation distance D. The same description may be made with respect to the second and third embodiments.

In addition, in the aforementioned embodiments, the case where each of the sampling periods of the three-axis acceleration sensor 4, the Y axis gyro-sensor 5, and the Z axis gyro-sensor 6 is set to 50 [Hz] is described.

The invention is not limited thereto. For example, each of the sampling periods may be set to various values such as 100 [Hz] or 200 [Hz]. In addition, the sampling periods of the sensors may be configured to be different from each other. In this case, in particular, the threshold values TH in the second embodiment may be set so as to correspond to the sampling periods.

In addition, in the aforementioned first embodiment, the case where the PND 1 is installed at the front side in the vehicle room of the vehicle 9 and, since the vehicle 9 is highly likely to drive forwards, the time difference ΔT is calculated while firstly shifting the waveform of the acceleration $\alpha_z$ to the past is described.

The invention is not limited thereto. For example, in the case where the installation position of the PND 1 is determined to be at the rear side in the vehicle room according to the user's input manipulation, the determination result of the installation distance setting portion 38, or the like, the time difference ΔT may be calculated by firstly shifting the waveform of the pitch rate $\omega_y$ to the past.

In addition, in the aforementioned first embodiment, the case where the installation distance setting portion 38 is allowed to determine the installation position (front side or rear side) of the PND 1 in the vehicle 9 based on the sign of the GPS velocity VG and the precedence information IA to change the sign of the installation distance D is described.

The invention is not limited thereto. For example, the installation position (front side or rear side) of the PND 1 in the vehicle 9 may be set by the user, and the installation distance D generated by the installation distance setting portion 38 may be always set to a positive value. The same description may be made with respect to the second and third embodiments.

In addition, with respect to the installation distance D, if the value generated by the installation distance setting portion 38 and the value input by user's manipulation are greatly different from each other, the value generated by the installation distance setting portion 38 may be preferentially used or the value input by the user's manipulation may be preferentially used. In this manner, any one of the values may be preferentially used. The same description may be made with respect to the second and third embodiments.

In addition, in the aforementioned first embodiment, the case where, if the time differential velocity data VTD is less than the minimum power threshold value THL, the autoregulation velocity output portion 37 is allowed to replace the time differential velocity data VTD with a value of "0" and to set time differential velocity data VTD as the autoregulation velocity data VD is described.

The invention is not limited thereto. For example, if the time differential velocity data VTD is less than the minimum output threshold value THL, autoregulation velocity output portion 37 may be allowed to replace the time differential velocity data VTD with the immediately previous time differential velocity data VTD and to set time differential velocity data VTD as the autoregulation velocity data VD or various correcting processes such as a process of directly setting time differential velocity data VTD as the autoregulation velocity data VD irrespective of the value of the time differential velocity data VTD may be performed. In addition, the process may be performed by the time differential velocity calculating portion 35 or the smoothing and noise removing portion 36. The same description may be made with respect to the second and third embodiments.

In addition, in the aforementioned embodiments, the case where the LPF/HPF processing portion 33 is allowed to perform the high pass filter process and the lowpass filter process on the acceleration data AD and the pitch rate data PD detected by the three-axis acceleration sensor 4 and the Y axis gyro-sensor 5 is described.

The invention is not limited thereto, but the LPF/HPF processing portion 33 may be allowed to perform a movement average filter process on the acceleration data AD and the pitch rate data PD as well as the high pass filter process and the lowpass filter process. In addition, the LPF/HPF processing portion 33 may be allowed to perform an arbitrary combination of the high pass filter process, the lowpass filter process, and the movement average filter process on the acceleration data AD and the pitch rate data PD. The same description may be made with respect to the second and third embodiments.

In addition, in the aforementioned first embodiment, the case where the time differential velocity VT is calculated in the state that the PND 1 is held by the cradle 10 mounted on the dashboard of the vehicle 9 is described.

The invention is not limited thereto. For example, if it is perceived that the PND 1 is mechanically or electrically detached from the cradle 10, the time differential velocity VT may be set to 0 or the immediately previous time differential velocity VT may be maintained. The same description may be made with respect to the second and third embodiments.

In addition, in the aforementioned first embodiment, the case where the PND 1 is used in a state that it is disposed to be horizontally long in the leftward and rightward directions is described.

Figure 27:
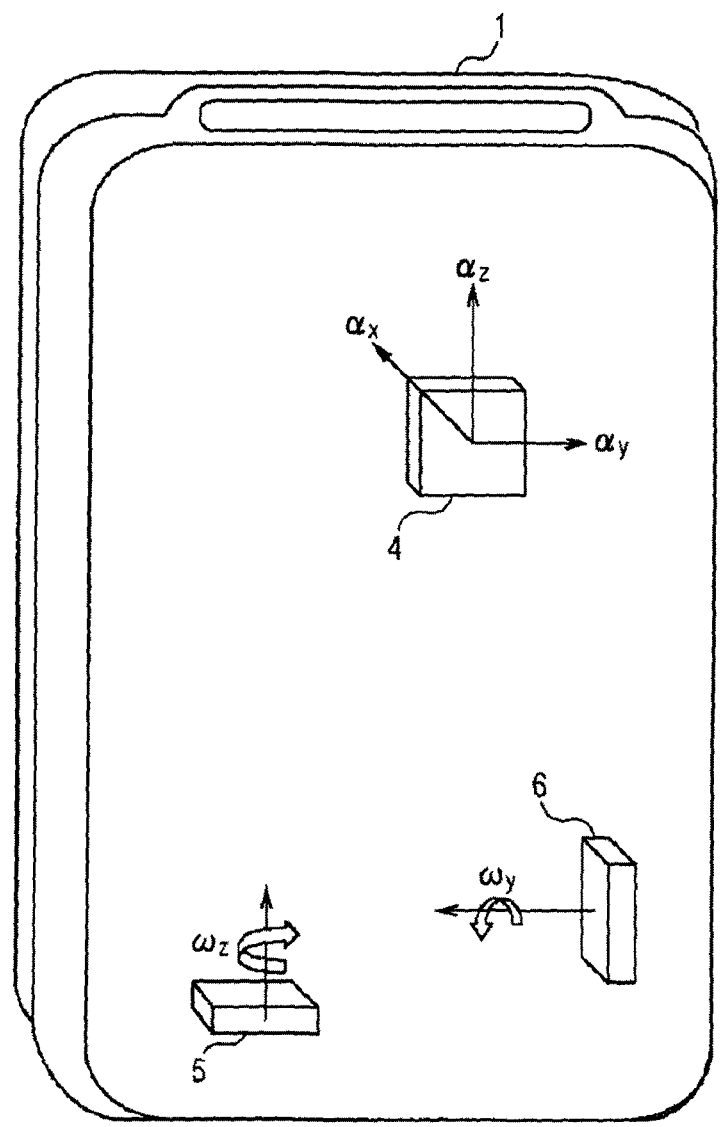
FIG. 27 is a schematic diagram illustrating examples of uses according to other embodiments.

The invention is not limited thereto. For example, as illustrated in FIG. 27, the PND 1 may be used in a state that it is disposed to be vertically long in the vertical direction. In this case, the PND 1 may detect the yaw rate $\omega_z$ of the Z axis rotation by the Y axis gyro-sensor 5 and detect the pitch rate $\omega_y$ around the Y axis by the Z axis gyro-sensor 6. The same description may be made with respect to the second and third embodiments.

In addition, in the aforementioned first embodiment, the case where the three-axis acceleration sensor 4, the Y axis gyro-sensor 5, and the Z axis gyro-sensor 6 are installed inside the PND 1 is described.

The invention is not limited thereto, but the three-axis acceleration sensor 4, the Y axis gyro-sensor 5, and the Z axis gyro-sensor 6 may be installed outside the PND 1. The same description may be made with respect to the second and third embodiments.

In addition, the PND 1 may be provided with an adjustment mechanism for adjusting the installation angles of the three-axis acceleration sensor 4, the Y axis gyro-sensor 5, and the Z axis gyro-sensor 6, for example, at a side surface of the casing. Accordingly, even in the case where the display portion 2 is not installed to be substantially perpendicular to the moving direction of the vehicle 9, the PND 1 allows, for example, the rotation axis of the Y axis gyro-sensor 5 to be aligned with the vertical direction of the vehicle 9 by user's adjusting the adjustment mechanism. The same description may be made with respect to the second and third embodiments.

In addition, in the aforementioned first embodiment, the case where the controller 12 of the PND 1 allows the process procedures of the aforementioned routines RT1, RT2, and RT3 to be performed according to the application program which is stored in the storage portion 13 in advance is described.

The invention is not limited thereto. The controller 12 of the PND 1 may allow the aforementioned process procedures to be performed according to an application program installed from a storage medium, an application program downloaded from the Internet, or other application programs installed through various routes. The same description may be made with respect to the second and third embodiments.

In addition, in the aforementioned embodiments, the case of configuring the Y axis gyro-sensor 5 as a horizontal angular velocity detecting portion, the three-axis acceleration sensor 4 as a vertical acceleration detecting portion, the time difference calculating portion 34 as a time difference calculating portion, the time differential velocity calculating portion 35 as a velocity calculating portion, and the navigation unit 11 as a velocity calculating portion is described.

However, the invention is not limited thereto, but the velocity calculating portion may be configured with a horizontal angular velocity detecting portion, a vertical acceleration detecting portion, a time difference calculating portion, and a velocity calculating portion which have other various configurations.

In addition, in the aforementioned embodiments, the case of configuring the navigation unit 11 as a navigation apparatus with the Y axis gyro-sensor 5 as a horizontal angular velocity detecting portion, the three-axis acceleration sensor 4 as a vertical acceleration detecting portion 3, the time difference calculating portion 34 as a time difference calculating portion, the time differential velocity calculating portion 35 as a velocity calculating portion, the Z axis gyro-sensor 6 as a vertical angular velocity detecting portion, the angle calculating portion 23 as an angle calculating portion, and the position calculating portion 25 as a position calculating portion is described.

However, the invention is not limited thereto, but the navigation apparatus may be configured with a horizontal angular velocity detecting portion, a vertical acceleration detecting portion, a time difference calculating portion, a velocity calculating portion, a vertical angular velocity detecting portion, an angle calculating portion, and a position calculating portion which have other various configurations.

The present application contains subject matter related to that disclosed in Japanese Priority Patent Application JP 2009-275758 filed in the Japan Patent Office on Dec. 3, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A velocity calculating apparatus comprising:
a horizontal angular velocity detecting portion disposed to a main body portion attached to a movable object moving along a movement plane and configured to detect a horizontal axis angular velocity which is an angular velocity around a horizontal axis perpendicular to a moving direction of the movable object generated according to an inclination angle of the movement plane;
a vertical acceleration detecting portion disposed to the main body portion and configured to detect a vertical acceleration which is an acceleration in the vertical direction generated according to a shape of the movement plane;
a time difference calculating portion configured to calculate a time difference between a characteristic component occurring in the horizontal axis angular velocity and a characteristic component occurring in the vertical acceleration due to a predetermined position of the movement plane; and
a velocity calculating portion configured to calculate a time differential velocity representing a velocity in the moving direction of the movable object based on a ratio between an installation distance from a position to which the horizontal angular velocity is estimated to be exerted in the overall movable object to an installation position of the main body portion and the time difference.

2. The velocity calculating apparatus according to claim 1, wherein the time difference calculating portion calculates the time difference based on covariance values of the horizontal axis angular velocity and the vertical acceleration in a predetermined time interval.

3. The velocity calculating apparatus according to claim 1, wherein, in the case where a plurality of the time differences are calculated by the time difference calculating portion, the velocity calculating portion calculates the time differential velocity by selecting the time difference in which the calculated time differential velocity is closest to the immediately previous time differential velocity.

4. The velocity calculating apparatus according to claim 1,
wherein the time difference calculating portion calculates the time difference and generates precedence information representing which one of the horizontal axis angular velocity and the vertical acceleration precedes, and
wherein the velocity calculating portion calculates the time differential velocity of the movable object and determines the moving direction of the movable object based on the precedence information.

5. The velocity calculating apparatus according to claim 1,
wherein the movable object moves along the movement plane by wheels rotating around at least two or more axes, and
wherein the velocity calculating portion calculates the time differential velocity by using a distance from a central point between the axes to the installation position of the main body portion in the moving direction of the movable object as the installation distance.

6. The velocity calculating apparatus according to claim 1, further comprising:
a positioning unit configured to measure a current position of the movable object;
a positioning velocity calculating portion configured to calculate a positioning velocity representing a velocity of the movable object based on the positioning result of the current position; and
an installation distance calculating portion configured to calculate the installation distance based on the time difference calculated by the time difference calculating portion and the positioning velocity.

7. The velocity calculating apparatus according to claim 1, wherein the time difference calculating portion calculates the time difference based on correlation values of the horizontal axis angular velocity and the vertical acceleration in a predetermined time interval.

8. The velocity calculating apparatus according to claim 7,
wherein the horizontal angular velocity detecting portion and the vertical acceleration detecting portion detect the horizontal angular velocity and the vertical acceleration in a predetermined detection period, respectively; and
wherein the time difference calculating portion shifts the detection results of the horizontal axis angular velocity and the vertical acceleration in units of the detection period in the direction of the time axis and calculates the time difference at a time accuracy equal to or less than the detection period based on the correlation values obtained according to plural types of different time shift amounts.

9. The velocity calculating apparatus according to claim 1, wherein the time difference calculating portion calculates a difference between a time point at which a waveform of the horizontal axis angular velocity becomes a maximum value or a minimum value and a time point at which a waveform of the vertical acceleration becomes a maximum value or a minimum value in a predetermined time interval as the time difference.

10. The velocity calculating apparatus according to claim 9, wherein, in the case where a polarity of a detection value of the horizontal axis angular velocity and a polarity of a detection value of the vertical acceleration are different from each other, the time difference calculating portion calculates a difference between a time point at which the horizontal axis angular velocity becomes a maximum value or a minimum value and a time point at which the vertical acceleration becomes a minimum value or a maximum value in the time interval as the time difference.

11. The velocity calculating apparatus according to claim 1, further comprising:
a second velocity detecting portion configured to detect a velocity of the movable object as a second velocity by using a predetermined velocity detection method; and
an output processing portion configured to output the second velocity instead of the time differential velocity in the case where the time differential velocity is higher than a predetermined upper limit threshold value.

12. The velocity calculating apparatus according to claim 11, further comprising an upper limit threshold value setting portion configured to set the upper limit threshold value according to the installation distance.

13. The velocity calculating apparatus according to claim 1, further comprising an output processing portion configured to correct and output the time differential velocity in the case where the time differential velocity calculated by the velocity calculating portion is lower than a predetermined lower limit threshold value.

14. The velocity calculating apparatus according to claim 13, wherein, in the case where the time differential velocity is lower than the lower limit threshold value, the output processing portion replaces the time differential velocity with the time differential velocity that is calculated immediately previously.

15. The velocity calculating apparatus according to claim 13, wherein, in the case where the time differential velocity is lower than the lower limit threshold value, the output processing portion sets the velocity to 0.

16. A velocity calculating method comprising the steps of:
allowing a horizontal angular velocity detecting portion disposed to a main body portion attached to a movable object moving along a movement plane to detect a horizontal axis angular velocity which is an angular velocity around a horizontal axis perpendicular to a moving direction of the movable object generated according to an inclination angle of the movement plane;
allowing a vertical acceleration detecting portion disposed to the main body portion to detect a vertical acceleration which is an acceleration in the vertical direction generated according to a shape of the movement plane;
allowing a predetermined time difference calculating portion to calculate a time difference between a characteristic component occurring in the horizontal axis angular velocity and a characteristic component occurring in the vertical acceleration due to a predetermined position of the movement plane; and
allowing a predetermined velocity calculating portion to calculate a time differential velocity representing a velocity in the moving direction of the movable object based on a ratio between an installation distance from a position to which the horizontal angular velocity is estimated to be exerted in the overall movable object to an installation position of the main body portion and the time difference.

17. A navigation apparatus comprising:

a horizontal angular velocity detecting portion disposed to a main body portion attached to a movable object moving along a movement plane and configured to detect a horizontal axis angular velocity which is an angular velocity around a horizontal axis perpendicular to a moving direction of the movable object generated according to an inclination angle of the movement plane;

a vertical acceleration detecting portion disposed to the main body portion and configured to detect a vertical acceleration which is an acceleration in the vertical direction generated according to a shape of the movement plane;

a time difference calculating portion configured to calculate a time difference between a characteristic component occurring in the horizontal axis angular velocity and a characteristic component occurring in the vertical acceleration due to a predetermined position of the movement plane;

a velocity calculating portion configured to calculate a time differential velocity representing a velocity in the moving direction of the movable object based on a ratio between an installation distance from a position to which the horizontal angular velocity is estimated to be exerted in the overall movable object to an installation position of the main body portion and the time difference;

a vertical angular velocity detecting portion configured to calculate an angular velocity around a vertical axis perpendicular to the moving direction of the movable object;

an angle calculating portion configured to calculate a circulating angle of the movable object based on the angular velocity around the vertical axis; and a position calculating portion configured to calculate a position of the movable object based on the velocity in the moving direction calculated by the velocity calculating portion and the angle calculated by the angle calculating portion.

18. A mobile phone with a navigation function, comprising:

a horizontal angular velocity detecting portion disposed to a main body portion attached to a movable object moving along a movement plane and configured to detect a horizontal axis angular velocity which is an angular velocity around a horizontal axis perpendicular to a moving direction of the movable object generated according to an inclination angle of the movement plane;

a vertical acceleration detecting portion disposed to the main body portion and configured to detect a vertical acceleration which is an acceleration in the vertical direction generated according to a shape of the movement plane;

a time difference calculating portion configured to calculate a time difference between a characteristic component occurring in the horizontal axis angular velocity and a characteristic component occurring in the vertical acceleration due to a predetermined position of the movement plane;

a velocity calculating portion configured to calculate a time differential velocity representing a velocity in the moving direction of the movable object based on a ratio between an installation distance from a position to which the horizontal angular velocity is estimated to be exerted in the overall movable object to an installation position of the main body portion and the time difference;

a vertical angular velocity detecting portion configured to calculate an angular velocity around a vertical axis perpendicular to the moving direction of the movable object;

an angle calculating portion configured to calculate a circulating angle of the movable object based on the angular velocity around the vertical axis;

a position calculating portion configured to calculate a position of the movable object based on the velocity in the moving direction calculated by the velocity calculating portion and the angle calculated by the angle calculating portion, and a mobile phone portion configured to perform a call process through radio communication with a predetermined base station.

* * * * *